(12) United States Patent
Tuchrelo et al.

(10) Patent No.: US 10,398,256 B2
(45) Date of Patent: Sep. 3, 2019

(54) AUTOMATED CLEANING SYSTEM FOR FOOD PROCESSOR AND METHOD

(71) Applicant: Idea Boxx, LLC, Victor, NY (US)

(72) Inventors: Robert Tuchrelo, Williamson, NY (US); Jeffrey Cahoon, Williamson, NY (US); Richard T. Aab, Fairport, NY (US); Alfred S. Mustardo, Honeoye Falls, NY (US); Nathan E. Smith, Hamlin, NY (US); Jacob R. Parisi, Newark, OH (US); Edward F. Ruppel, III, Saratoga, CA (US); Gary M. Russotti, Boca Raton, FL (US); William Salminen, Sarasota, FL (US)

(73) Assignee: Idea Boxx, LLC, Victor, NY (US)

( * ) Notice: Subject to any disclaimer, the term of this patent is extended or adjusted under 35 U.S.C. 154(b) by 752 days.

(21) Appl. No.: 14/886,672

(22) Filed: Oct. 19, 2015

(65) Prior Publication Data
US 2016/0037963 A1     Feb. 11, 2016

Related U.S. Application Data

(62) Division of application No. 14/758,112, filed as application No. PCT/US2014/053495 on Aug. 29, 2014, now Pat. No. 9,516,889.
(Continued)

(51) Int. Cl.
*A23G 9/30* (2006.01)
*A47J 31/60* (2006.01)
(Continued)

(52) U.S. Cl.
CPC ............... *A47J 31/60* (2013.01); *A23G 9/30* (2013.01); *B08B 3/02* (2013.01); *B08B 3/08* (2013.01);
(Continued)

(58) Field of Classification Search
CPC .... A23G 9/30; A47J 31/60; B08B 3/02; B08B 3/08; B08B 9/0321; B08B 9/0325; B08B 9/0328; B67D 1/07
(Continued)

(56) References Cited

U.S. PATENT DOCUMENTS 3,898,859 A     8/1975  Duke
4,330,245 A     5/1982  Billett et al.
(Continued)

FOREIGN PATENT DOCUMENTS

GB     1562271 A     3/1980
GB     1562274 A     3/1980

OTHER PUBLICATIONS

European Search Report dated Apr. 6, 2017 (12 pages).
(Continued)

*Primary Examiner* — Levon J Shahinian
(74) *Attorney, Agent, or Firm* — Brian B. Shaw, Esq.; Harter Secrest & Emery LLP

(57) ABSTRACT

A self-contained system is provided for cleaning a food flow path in a food processor. The system can be operably engaged without requiring disassembly and reassembly of the food processor or can be operably engaged after a partial disassembly of the food processor. The system includes a control assembly for directing passage of a solution through the food processor without requiring constant operator oversight. The system can employ available positive pressure water supply, such as public utility water pressure to selectively and automatically push solutions, including rinses, backwards or forwards through a food flow path in the food processor, though typically countercurrent to the normal processing food flow. A manifold assembly includes an intake manifold and a distribution manifold, with an induction port and/or access port in the distribution manifold for
(Continued)

introducing additives or agents into a controlled motive stream passing through the manifold assembly.

27 Claims, 19 Drawing Sheets

Related U.S. Application Data

(60) Provisional application No. 61/878,472, filed on Sep. 16, 2013.

(51) Int. Cl.
    *B08B 3/02*   (2006.01)
    *B08B 3/08*   (2006.01)
    *B08B 9/032*  (2006.01)
    *B67D 1/07*   (2006.01)

(52) U.S. Cl.
    CPC .......... *B08B 9/0321* (2013.01); *B08B 9/0325* (2013.01); *B08B 9/0328* (2013.01); *B67D 1/07* (2013.01)

(58) Field of Classification Search
    USPC ... 134/57 R, 95.1, 98.1, 100.1, 102.1, 104.2, 134/166 R, 169 C, 169 R
    See application file for complete search history.

(56) References Cited

U.S. PATENT DOCUMENTS

| | | | |
|---|---|---|---|
| 4,378,034 | A | 3/1983 | Albertson |
| 4,404,040 | A | 9/1983 | Wang |
| 4,417,610 | A | 11/1983 | Waldstrom et al. |
| 4,703,628 | A | 11/1987 | Togashi et al. |
| 4,848,381 | A | 7/1989 | Livingston et al. |
| 4,860,550 | A | 8/1989 | Aoki et al. |
| 5,330,769 | A | 7/1994 | McKinzie et al. |
| 5,436,008 | A | 7/1995 | Richter et al. |
| 5,463,878 | A | 11/1995 | Parekh et al. |
| 5,535,923 | A | 7/1996 | Fujioka |
| 5,615,695 | A | 4/1997 | Chambers |
| 5,700,494 | A | 12/1997 | Masse et al. |
| 5,738,002 | A | 4/1998 | Marano-Ducarne |
| 5,948,439 | A | 9/1999 | Forman et al. |
| 6,136,362 | A | 10/2000 | Ashton |
| 6,472,358 | B1 | 10/2002 | Richter et al. |
| 6,490,872 | B1 | 12/2002 | Beck et al. |
| 6,553,779 | B1 | 4/2003 | Boyer et al. |
| 7,401,613 | B2 | 7/2008 | Carhuff et al. |
| 8,205,460 | B2 | 6/2012 | Russo et al. |
| 2002/0043071 | A1 | 4/2002 | Frank et al. |
| 2003/0012864 | A1 | 1/2003 | Gerber |
| 2003/0085237 | A1 | 5/2003 | Kaleman et al. |
| 2004/0001906 | A1 | 1/2004 | Carhuff et al. |
| 2004/0118291 | A1 | 6/2004 | Carhuff |
| 2006/0097003 | A1 | 5/2006 | Emmendoerfer et al. |
| 2007/0062212 | A1 | 3/2007 | Frank et al. |
| 2007/0231440 | A1 | 10/2007 | Taketsuka |
| 2009/0117242 | A1 | 5/2009 | Kaleman et al. |
| 2009/0120306 | A1 | 5/2009 | DeCarlo et al. |
| 2009/0285966 | A1 | 11/2009 | Tso et al. |
| 2010/0058772 | A1 | 3/2010 | Russo et al. |
| 2010/0062128 | A1 | 3/2010 | Khoo et al. |
| 2010/0136148 | A1 | 6/2010 | Saint Victor |
| 2011/0192433 | A1 | 8/2011 | Harris et al. |
| 2011/0197920 | A1* | 8/2011 | Kenowski ............... B08B 9/027 134/10 |
| 2013/0253059 | A1 | 9/2013 | Man et al. |
| 2014/0030203 | A1 | 1/2014 | Dombeck |

OTHER PUBLICATIONS

Zhao et al.: "Inactivation of *Salmonella* and *Escherichia coli* O157:H7 on Lettuce and Poultry Skin by Combinations of Levulinic Acid and Sodium Dodecyl Sulfate"—Journal of Food Protection, vol. 72, No. 5, 2009; pp. 928-936.

HealthPro Brands: "Fit Antibacterial Fruit & Vegetable Wash"—Oct. 3, 2006.

International Search Report and Written Opinion of the International Searching Authority in corresponding International Application No. PCT/US2014/053495, Completed Dec. 10, 2014 (8 pages).

Canadian Office Action in corresponding CA Application No. 2,924,481 dated Mar. 13, 2017 (5 pages).

\* cited by examiner

AUTOMATED CLEANING SYSTEM FOR FOOD PROCESSOR AND METHOD

FIELD OF THE INVENTION

The present disclosure relates to an apparatus and method for cleaning a food processor and in a preferred configuration to cleaning the food processer with a flow of solution that is counter current or reverse to a normal or forward processing through a food flow path in the food processor. The present system thus provides a clean-in-place system (CIP) for the food processor.

BACKGROUND OF THE INVENTION

It is generally understood that fluid dispensing systems having fluid lines that carry fluids to a point of use need cleaning from time to time in order to ensure that no deposits or microorganisms collect in the fluid lines. For example, beverage distribution systems employ the use of beverage lines to carry beverages from beverage containers, or tanks, to dispensing units, which dispense the beverages to drinking containers. If for some reason, these beverage lines are not cleaned on a regular basis, the collection of bacteria and deposits therein may contaminate the beverages thereby making the beverages unsafe to drink. Moreover, in commercial restaurant settings, food and health regulations actually require the periodic cleaning of beverage dispensing systems.

Similarly, food processors having a food flow path require periodic rinsing, cleaning and/or sanitizing.

It is well known to use portable chemical dispenser systems to clean out beverage lines and other components of beverage dispensing systems. With these portable systems, users have become quite effective in meeting the various requirements imposed by food and health regulations. However, these prior art methods are extremely time consuming and require the attention of at least one person to manually move the chemical dispense systems between each of the various beverage lines that require cleaning in a particular beverage dispense system. To add to the frustration, more and more restaurants are offering a larger variety of beverages than offered in years past, thereby making an extremely time demanding process even more demanding.

Therefore, a need exists for a system for selectively rinsing, cleaning and/or sanitizing a food flow path in a food processor with reduced operator input and time, while providing enhanced reporting and monitoring.

SUMMARY OF THE INVENTION

In one configuration a method is provided including the steps of engaging a manifold assembly with a food processor having a food flow path with a forward flow direction for processing a food product from an upstream end to a downstream dispensing port; and passing a pressurized cleaning solution from the engaged manifold assembly through the dispensing port to pass the cleaning solution along a portion of the food flow path in a reverse flow direction from the dispensing port toward the upstream end.

It is further contemplated locating a dispensing valve in the food flow path controlling flow of the food product in the forward direction passing through the dispensing port, the dispensing valve moveable between an open position and a closed position, and the manifold assembly including distribution manifold having a wash barrel sized to be received within the food processor and move the dispensing valve to the open position. It is understood the dispensing port is an extrusion die. The steps can also include locating a bypass line at a forward flow outlet of a hopper to pass the cleaning solution along the food flow path in the reverse direction without contacting food product in the hopper.

A further step can include locating a pressure cover having a drain port to cover a hopper and sufficiently seal the hopper so that pressure of the cleaning solution entering the hopper is sufficient to force material through the drain port in the cover.

The cleaning solution can be formed to include at least one of lactic acid, acetic acid, caprylic acid an levulinic acid and at least one of sodium dodecyl sulfate and sodium lauryl sulfate. A cleaning agent can be manually introduced into the manifold assembly.

The discharge port can be constructed as a pinch off valve having an open position and a closed position.

A further method of cleaning a food processor having a forward flow direction for processing a food product along a food flow path terminating at a dispensing port, the food flow path including an enclosed length, is provided through the steps of passing a cleaning solution in a reverse direction along at least a portion of the enclosed length of the food flow path. The cleaning solution can be formed to include at least one of citric, lactic, malic, acetic, adipic, fumaric, glutaric, tartaric, fumaric, succinic, propionic, aconitic, sorbic, gluconic, ascorbic, and/or humic acids and at least one of sodium dodecyl sulfate and sodium lauryl sulfate.

The method can include passing the cleaning solution in a reverse direction through the dispensing port to one of an inlet or hopper in the food flow path, the one of the inlet or hopper being upstream of the dispensing port with respect to the forward flow direction.

Further, the method can also include passing the cleaning solution through a bypass line in the one of the inlet or hopper to isolate food product in the hopper from the cleaning solution. The steps can include moving a dispensing valve of the food processor to an open position and passing the cleaning solution through the open dispensing valve prior to entering the enclosed length. It is also understood the method can include passing the cleaning solution through an aperture in a bushing to expose an upstream side and a downstream side of the bushing to the cleaning solution.

The cleaning solution can be passed through a plurality of apertures in a beater blade within the enclosed length. Thus, the cleaning solution contacts a sealing surface in the food flow path, and the sealing surface includes PTFE.

The cycling the cleaning solution and a rinse in the reverse direction along the portion of the enclosed length can be automatically regulated.

The steps can include providing an aperture in the beater blade in the food flow path for food product having at least an 8% fat content or added particulates.

An apparatus is disclosed for cleaning a food processor having a forward flow direction along a food flow path for processing a food product, the food flow path including an enclosed length and terminating at a dispensing port, the apparatus having a manifold assembly engaging the food processor, the manifold assembly including an induction port, a solution input and an outlet configured to fluidly engage the dispensing port; and a control valve operably coupled to the manifold assembly to selectively pass a cleaning solution through the outlet and into the food flow path in the reverse direction.

The apparatus can include a drain line fluidly connected to the flood flow path at a location upstream of the dispensing port relative to the forward flow direction. The apparatus can also include a bypass tube fluidly connecting to the food flow path at a location upstream of the dispensing port relative to the forward flow direction, the bypass tube isolating food product in a portion of the food flow path from the cleaning solution.

A wand assembly can be included wherein the wand assembly has a wand manifold, the wand manifold including a venturi, the wand manifold connected to the manifold assembly. In one configuration, a wash barrel is connected to the manifold assembly, the wash barrel sized to engage and seal the dispensing port of the food processor and permit flow into the food flow path in a reverse direction.

A further apparatus is provided for cleaning a food processor having a forward flow direction along a food flow path for processing food, the food flow path including an enclosed length and terminating at a dispensing port, the apparatus includes an intake manifold having a first inlet port and a first outlet port, a control valve intermediate the first inlet port and the first outlet port, a controller connected to the control valve for regulating flow through the control valve from the first inlet port to the first outlet port and a distribution manifold having a first input port and a fluidly connected first outlet port, the distribution manifold having an induction port fluidly intermediate the first input port and the first output port.

In one configuration, the distribution manifold includes a venturi intermediate the first input port and the first output port and the induction port is coupled to the venturi. The distribution manifold can include a check valve intermediate the first input port and the first output port.

A manifold is also disclosed, the manifold having an intake manifold having a first inlet port and a first outlet port, a control valve intermediate the first inlet port and the first outlet port, and a distribution manifold having a first input port and a fluidly connected first outlet port, the first input port fluidly connected to the first outlet port and the distribution manifold having an induction port fluidly intermediate the first input port and the first output port.

The distribution manifold can include a venturi intermediate the first input port and the first output port and the induction port is coupled to the venturi. Also, a controller assembly can be provided and configured to releasably engage a food processor. In one configuration, a wash barrel can be connected to the distribution manifold, the wash barrel selected to engage a dispensing valve of a food processor. A wand assembly fluidly can be connected to the distribution manifold. Further, a check valve can be fluidly connected to the induction port.

A further method includes passing a regulated flow of a solution through a manifold assembly into a downstream portion of a food flow path of a food processor, the downstream portion of the food flow path being downstream of an upstream portion of the food flow path for flow in a forward direction of processing along the food flow path and exiting the regulated flow from the food flow path at an upstream portion of the food flow path.

Yet another method includes controlling a flow of solution through a manifold assembly, introducing an additive through an induction port in the manifold assembly to form a mixture and passing the mixture from the manifold assembly to pass along at least a portion of a food flow path of a food processor in a direction counter to a processing direction along the food flow path.

DETAILED DESCRIPTION OF THE INVENTION

Figure 1:
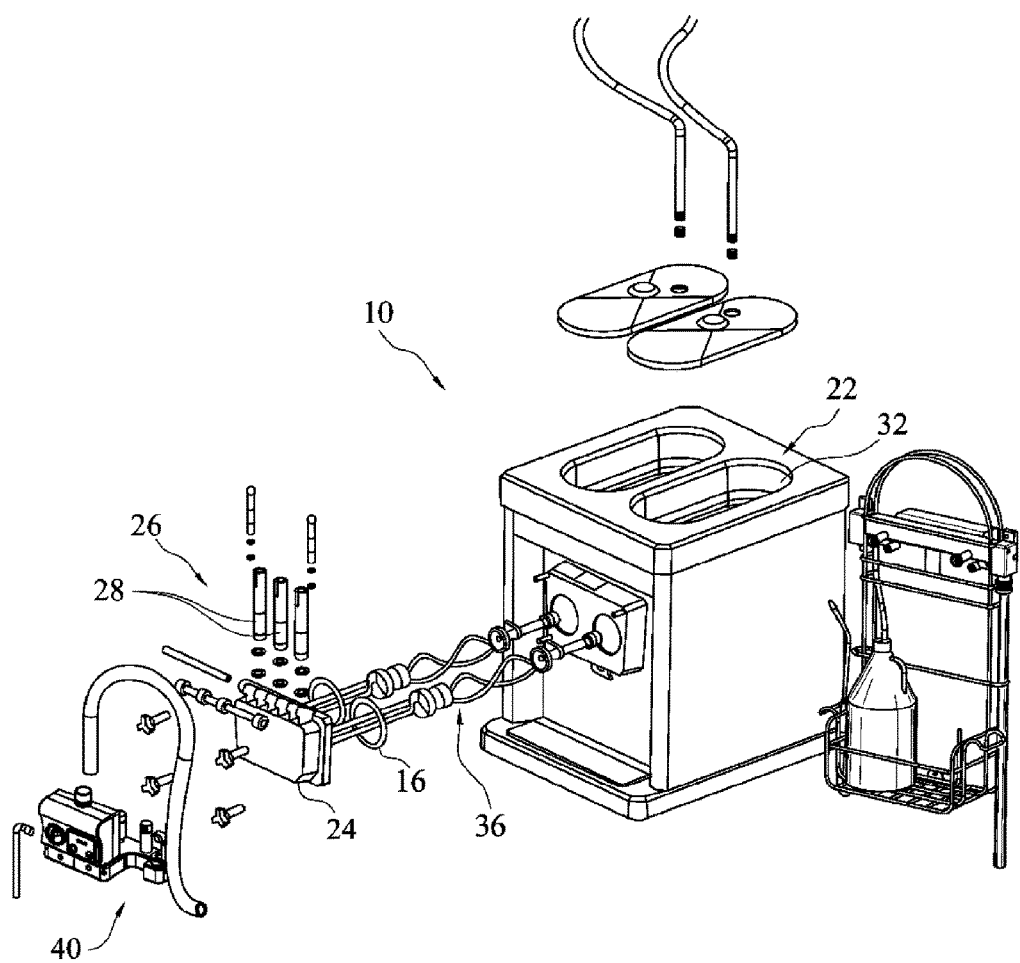
FIG. 1 is an exploded perspective view of a representative food processor and the present system.

Referring to FIG. 1, a representative food processor 10 is shown. The food processor 10 can be any of a variety of configurations including, but not limited to, frozen or chilled food product including but not limited to, beverages such as sodas, beer or wine.

Food Processor

Figure 2:
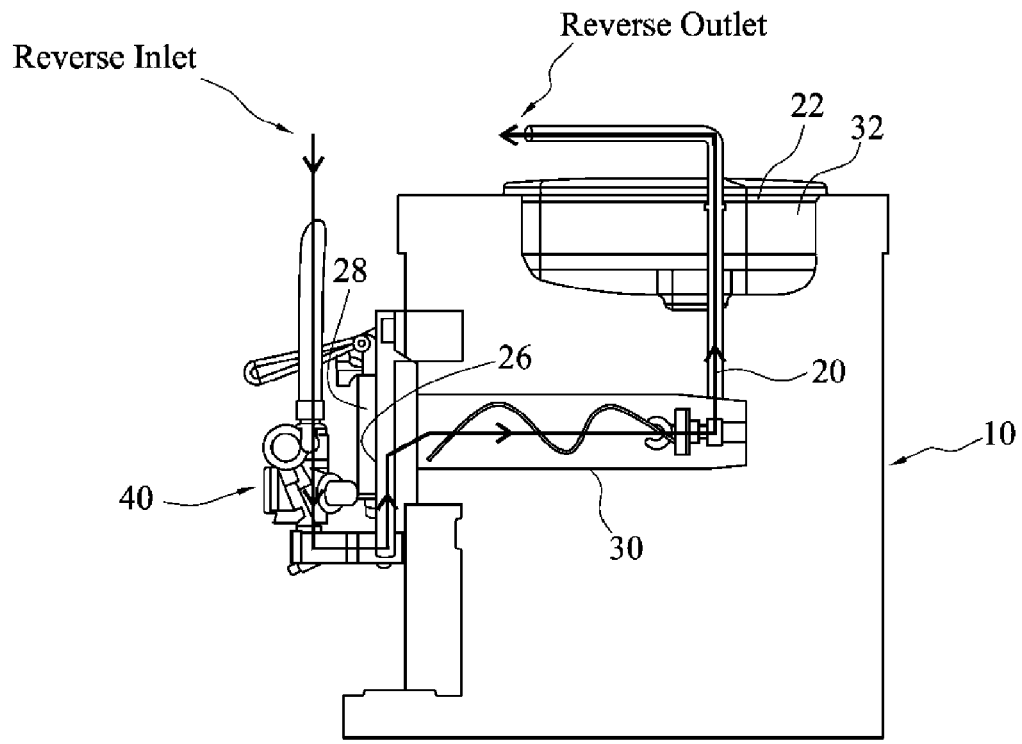
FIG. 2 is a side elevational view of a representative food flow path in a food processor showing a reverse flow as contemplated in the present system.

Referring to FIGS. 1 and 2, in one configuration, the food processor 10 includes a food flow path 20 extending from an input or upstream end 22, such as a reservoir, feed tube or line inlets or hopper 32 to an output or downstream end 24, such as a dispensing interface 26 from which the food product exits the food processor. The food product passes, in a normal or forward direction along the food flow path 20, from the input end 22 to the output end 24. In certain configurations, the dispensing interface 26 includes at least one dispensing valve 28 for selectively passing or allowing passage of the processed food product from the food processor 10. In certain configurations, the dispensing interface 26 includes a plurality of dispensing valves 28, such as but not limited to one, two, three or more.

The food processor 10 can include any variety of devices, including but not limited to soft serve machines, batch freezers, slush freezers, shake freezers, blended ice machines or food processors for extruding food products which include flows, grains or meats as well as liquid dispensers for beverages including soft drinks, diary drinks or alcoholic beverages such as fermented or distilled spirits. Thus, the food product can be any corresponding product that may be temperature controlled, mixed, blended, altered, processed or extruded.

In certain configurations as seen in FIGS. 1 and 2, the food flow path 20 incorporates a number of processing stations 30 intermediate the upstream end 22 (such as the hopper) and the downstream end 24, (such as the dispensing valve 28). For example, the processing stations 30 can include mixing chambers and temperature control chambers along the food flow path 20. The mixing chambers include chambers for mixing ingredients provided in a stream as well as ingredients from different inputs such that the mixing chamber is the volume of initial combination of different ingredients.

In further configurations, processing chambers 30, such as the mixing chamber and/or temperature control chamber of FIG. 2 can include a blade or beater assembly 36 for agitation of the food product within the chamber, such as by rotation within the chamber.

Alternatively, the food flow path 20 can function primarily as a conduit from the input end 22 to the dispensing interface 26. In these configurations it is understood the food processor 10 can function merely to selectively dispense the food product or can provide an alteration or conditioning of the food product such as temperature change, carbonation as well as mixing (compounding). Examples of the food processor 10 having these food flow paths 20 include dispensing devices such as automated soda dispensers, beer and wine dispensers.

It is further understood the food flow path 20 can include a plurality of inputs 22 with a corresponding smaller or a greater number of outputs 24 depending on the intending operating function of the food processor 10.

A representative food flow path 20 through the food processor, with the reverse direction indicated by arrows, is shown in FIG. 2.

While the input or upstream end 22 of the food flow path 20 is shown in FIG. 2, above the output or downstream end, it is understood the input can be located below the output, wherein the food product is pumped up from a supply, hopper or reservoir and along the food flow path to exit at the dispensing interface 26.

CIP System

The present clean in place (CIP) system 40 cooperates with the food processor 10 to selectively pass a solution or a rinse through at least a portion of the food flow path 20 intermediate the downstream end 24 and the upstream end 22, wherein the introduced solution or rinse travels counter current or reverse to the forward, or normal, direction through the food flow path.

The term solution is intended to encompass a cleaning, rinsing, disinfecting or sterilizing solution, as well as combinations or mixtures. For purposes of description, the present system is set forth in terms of using the solution, however it is understood the term solution encompasses water (or other liquid) such as a rinse that may be employed. The term solution also includes a gas or vapor such as steam as well as other disinfecting gas. It is understood, the present system 40 can employ any of a variety of cleaning (and/or disinfecting) materials including liquids, gases and combinations thereof. The solution can be at least partly formed by an addition of an acidic or basic wash concentrate to public utility water. Exemplary acidic washes for the solution include citric, lactic, malic, acetic, adipic, fumaric, glutaric, tartaric, fumaric, succinic, propionic, aconitic, sorbic, gluconic, ascorbic, and/or humic acids and at least one of sodium dodecyl sulfate and sodium lauryl sulfate.

In one configuration, the solution is presented to the system 40 at or within a given pressure range. However, it is understood the solution can be drawn from a reservoir or supply, wherein a pump (not shown) can be used to pressurize the solution for presentation to the system 40. The solution, or select constituents of the solution are a motive fluid for use in the system.

Figure 3:
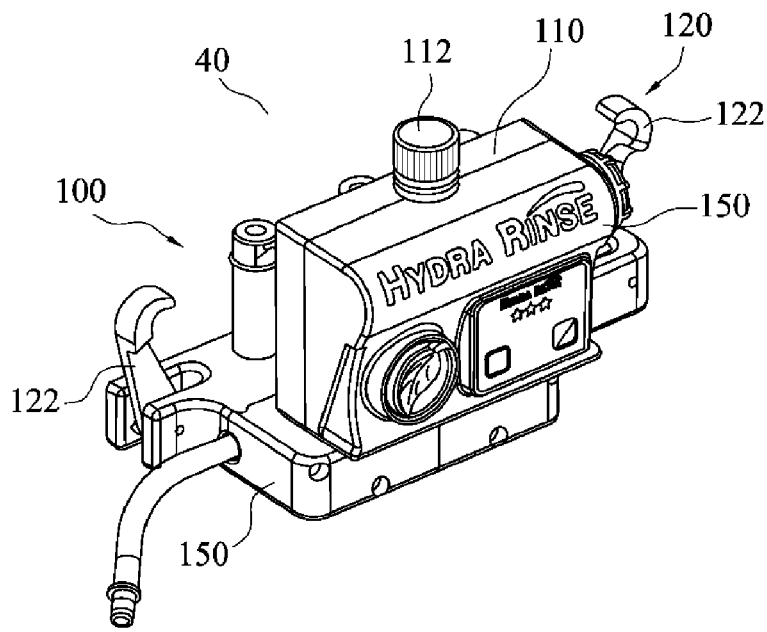
FIG. 3 is a perspective view of a standalone configuration of the system.
Figure 6:
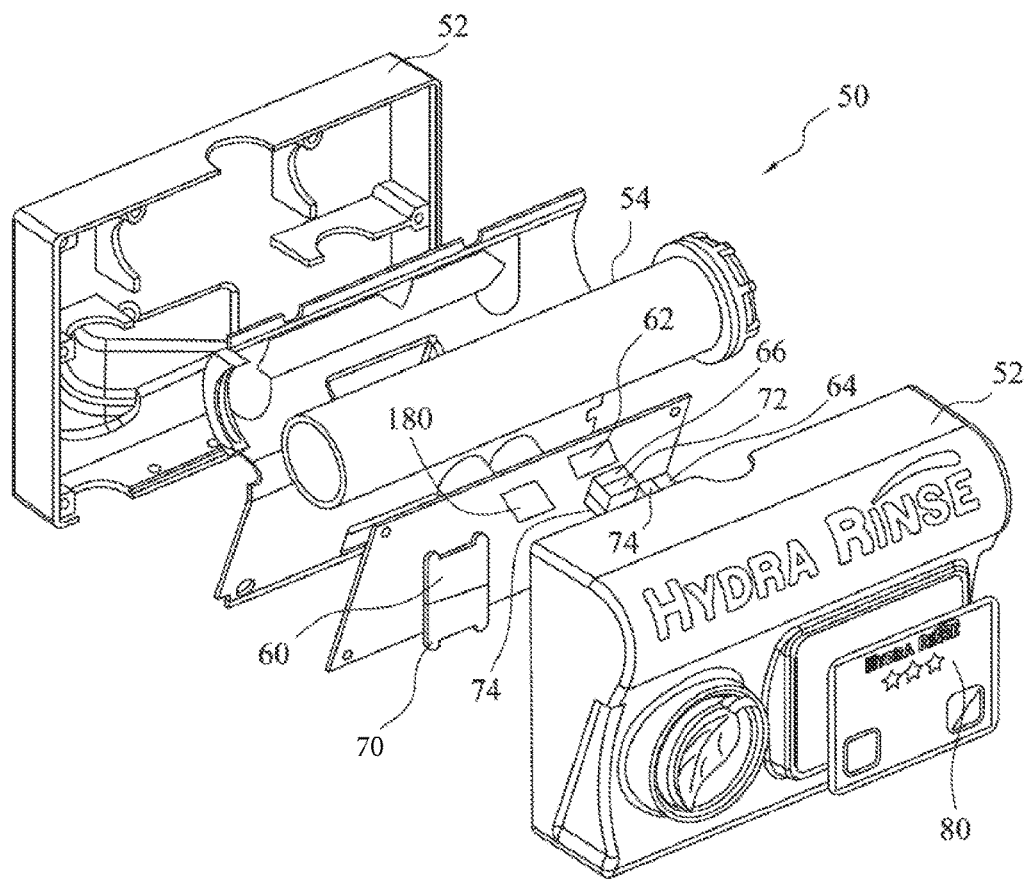
FIG. 6 is an exploded perspective view of the controller assembly.
Figure 7:
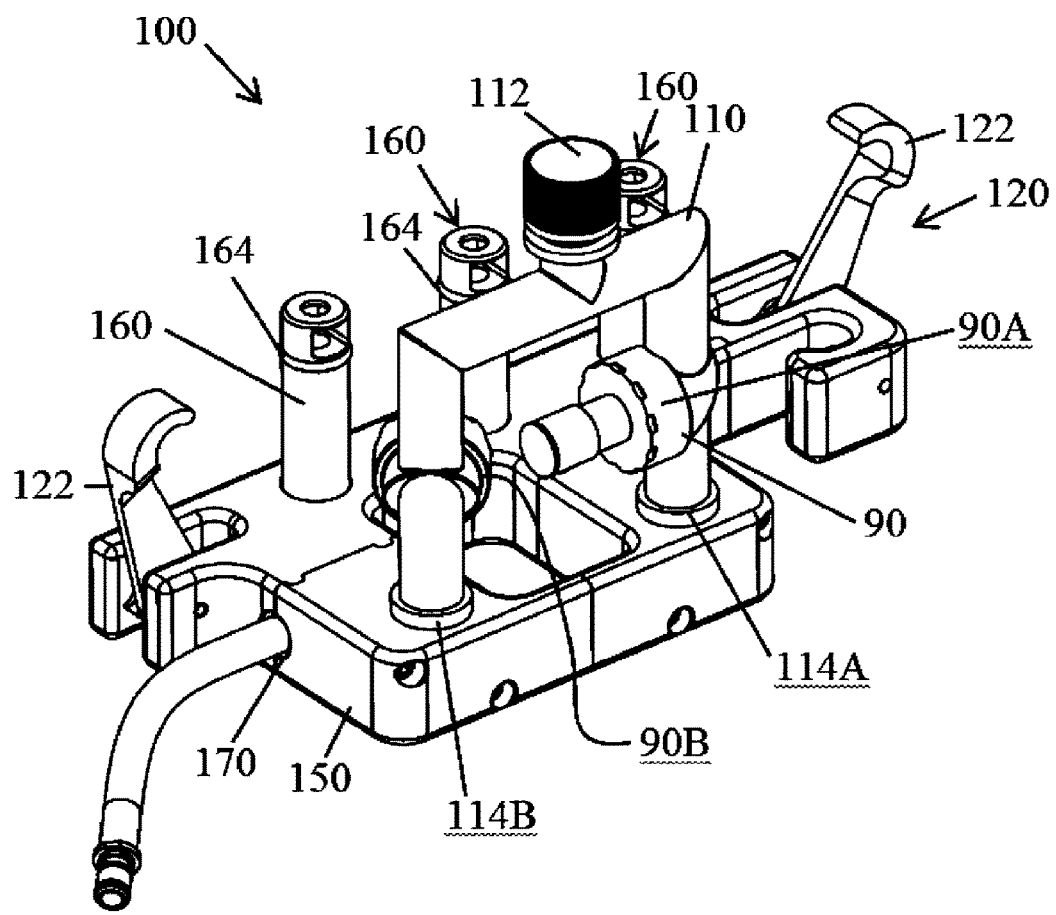
FIG. 7 is a perspective view of the intake manifold and the distribution manifold of the manifold assembly.

Referring to FIGS. 3, 6, and 7, the CIP system 40 includes a controller assembly 50 and a manifold assembly 100, wherein the manifold assembly includes an intake manifold 110 and a distribution manifold 150 (FIG. 7). The manifold assembly 100 can further include mounting hardware, such as arms 180.

The CIP system 40 can assume a variety of configurations. In one example, the CIP system is (i) referring to FIG. 3, a standalone system wherein the controller assembly 50 and the manifold assembly 100 are a single unit that is a separate construction from the food processor 10 and releasably engages the food processor, (ii) referring to FIG. 4, an integral system, wherein the controller assembly and the manifold assembly are substantially incorporated within or integral with the food processor (either as an after-market or original equipment manufacturer) or (iii) referring to FIG. 5, a hybrid system, wherein certain portions are integral with or embedded in the food processor and certain portions are separate or interchangeable-such as the distribution manifold 150 being integral (or coupled to) with the food processor 10 and the intake manifold 110 along with controller assembly being separate (interchangeable).

Figure 4:
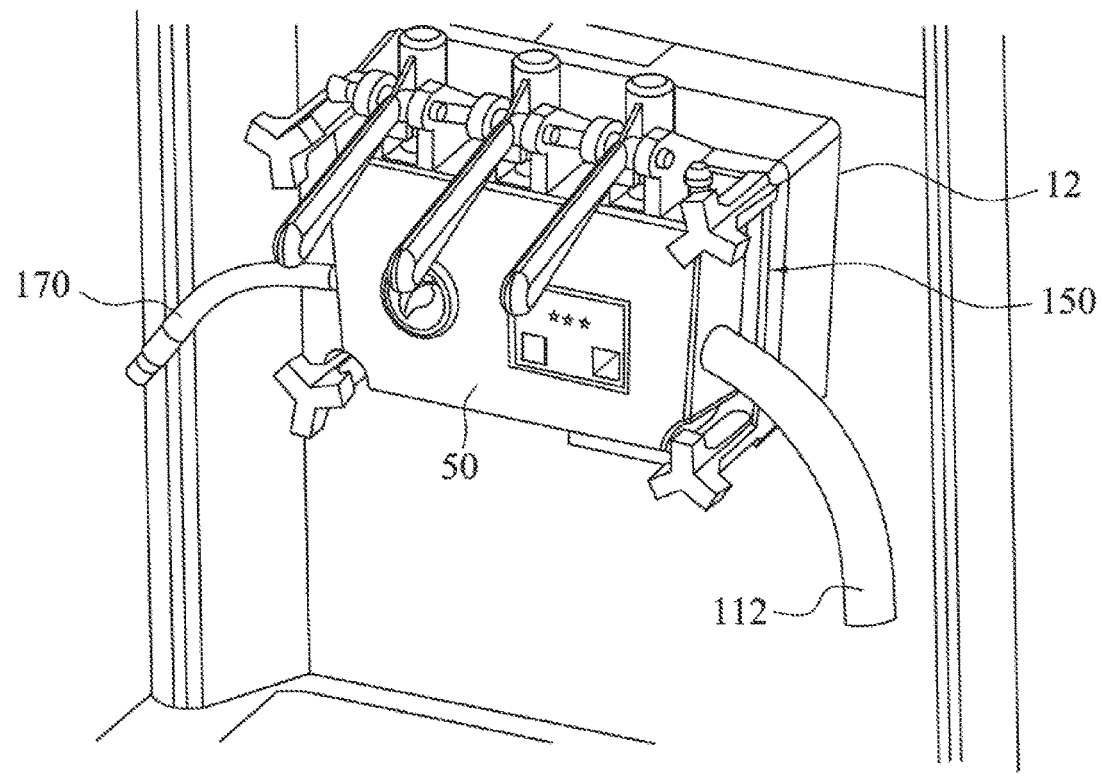
FIG. 4 is a perspective view of an integral configuration of the system.

Referring to FIG. 4, in the integral configuration, the system 40 is effectively an internal mechanism to the food processor 10. By embedding the system 40 into the food processor 10, the system becomes a component of the food processor. The integral configuration eliminates the need of an operator to engage the system 40 with the food processor 10 every time cleaning is to be performed. The integral configuration also simplifies the interface of the manifold assembly 100 and the food processor 10. By combining the system 40 into the food processor 10, a door assembly 12 of the food processor can incorporate the manifold assembly to the food processor itself, only requiring an external, or internal liquid and/or gas supply to perform the desired cleaning process.

Figure 5:
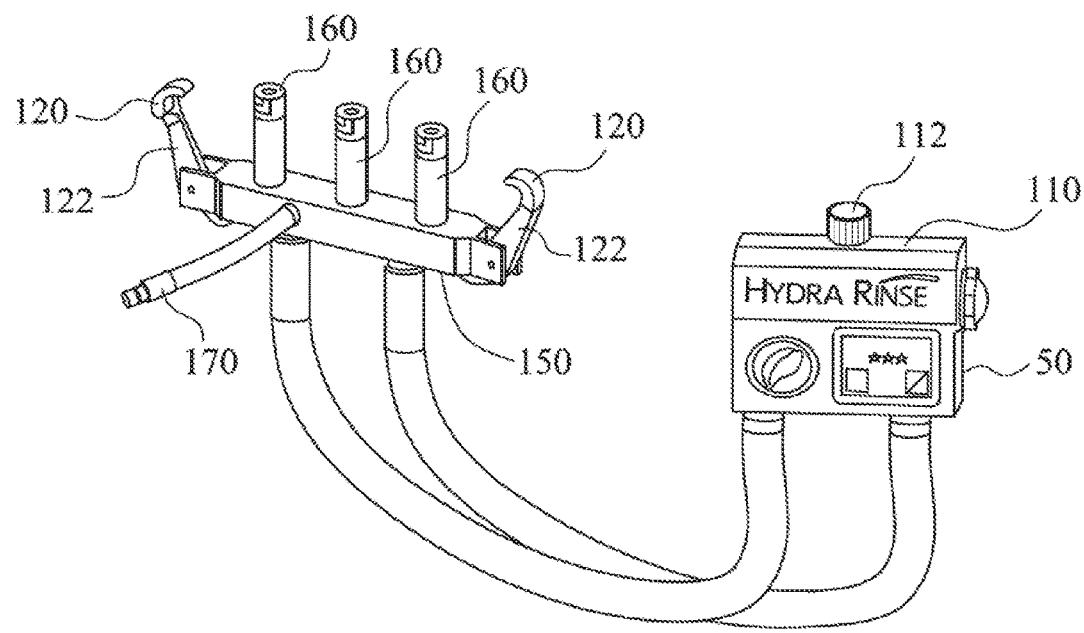
FIG. 5 is a perspective view of a hybrid configuration of the system.

In the hybrid modular configuration, interchangeability is provided between different designs of the food processor 10. That is, as seen in FIG. 5, the intake manifold 110 and the controller assembly 50 are separated from the distribution manifold 150, yet operably connected by tubing or piping (umbilical) allowing for functionality as set forth below. The hybrid configuration allows for quick change out of the distribution manifold 150, while retaining standard controller assembly 50 (and intake manifold 110) configurations across multiple platforms. The controller assembly 50 can be mounted separately from the food processor 10 to provide even greater design flexibility, and reduction of overall weight of the combined system.

Controller Assembly

Referring to FIG. 6, the controller assembly 50 includes control circuitry 60, a user interface and a control valve 90 (FIG. 7), wherein at least some of the components are retained in a housing 52 and the control valve operates in the intake manifold 110. In one configuration, the housing 52 is water or splash resistant and in certain configurations water or splash proof (for intended operating parameters). In certain configurations, the controller assembly 50 also includes a power supply 54 and a communications module 70, as seen in FIG. 6.

As seen in FIG. 7, the intake manifold 110 includes an inlet port 112 for receiving a pressurized source of solution, such as publically available water, into the system 40 and a plurality of outlet ports 114, wherein the outlet ports are fluidly connected to the distribution manifold 150. As seen in the configuration in the accompanying Figures, the intake manifold 110 includes a single inlet port 112 and two outlet ports 114. However, it is understood the intake manifold 110 can include a plurality of inlet ports 112 and a plurality of outlet ports 114 or a plurality of inlet ports and a single outlet port.

Referring to FIG. 7, at least one control valve 90 is located fluidly intermediate the inlet port 112 and the outlet ports 114. In one configuration, the intake manifold 110 includes a single inlet port 112 and two outlet ports 114, wherein the control valve 90 regulates which outlet port is fluidly connected to the inlet port. In a further configuration, as seen in FIG. 7, the controller assembly 50 includes a first 90a and a second control valve 90b, wherein flow to each outlet port 114 is regulated by a corresponding control valve.

The control valves 90 are configured to selectively pass water (solution) from the inlet port 112 through one or a plurality of the outlet ports 114. That is, the control valves 90 are moveable to provide a flow (including partial or full flow) and no-flow status.

The control circuitry 60 of the controller assembly 50 is operably connected to the control valves 90, the user interface 80 and the power supply 54 to provide for control of the passage of the pressurized water from a given inlet port 112 to a given outlet port or ports 114 of the intake manifold 110.

Referring to FIG. 6, the control circuitry 60 can include timing circuits 62 as well as counter circuits 64 for controlling the passage of material from the controller assembly 50, and hence the CIP system 40. It is understood the control circuitry 60 can incorporate the functionality of commercially available sprinkler systems.

The control circuitry 60 can be provided in a dedicated processor or programmed into a processor 66, such as a PCB microprocessor or controller.

As shown in FIG. 6, the control circuitry 60 can also include a communication module 70 which can include readers 72 such as contact or contactless readers for communicating with RFID or RFID type tags for data storage/identification/controller manipulation. It is also contemplated the control circuitry 60 can include memory 74, such as but not limited to nonvolatile memory (NVM), wherein the readers allow for receiving internal software NVM/firmware updates.

The communication module 70 and/or control circuitry 60 can include, but is not limited to, capability of bluetooth or Wi-Fi type communication protocol. Thus, the communication module 70 is capable of sending and receiving data for control specific functions pertaining to the performance of the system 40 and/or data transfer to an external device capable of receiving and storing information externally for later manipulation. The communication module 70 can also be configured to communicate/control extensions of the system 40 that are not physically attached to the housing 52, such as controlling an external valve(s) that also redirects liquid and/or gas based agents such as for introduction through the manifold assembly 100.

The communication module 70 can include the reader 72, such as a wireless, RFID or contactless reader. In one configuration, the agents introduced into the system 40 or employed by the system can be accompanied by a tag or card, such as an RFID tag that can be read by the communication module 70. The control circuitry 60 can then identify and verify the additive to ensure compliance with cleaning procedures. Thus, the system 40 can be programmed to operate only with material from an original equipment manufacturer.

The communication module 70 can be incorporated into the control circuitry 60 or can be a separate module. The communication module 70 provides for communication with an operator to and from the control circuitry 60 through any available channel including, but not limited to wireless and wireless networks such as blue tooth, Wi-Fi, cellular, satellite as well as local WI-FI.

The communication module 70 can also be configured to communicate directly with the food processor 10. It is known that certain food processors 10 include a control system for monitoring and reporting, both for diagnostics and processing. The communication module 70 of the CIP system 40 can be selected to communicate directly with the food processor 10 and thus respond to use cycles and operation parameters of the food processor to provide efficient and timely cleaning of the food processor under an automated cycle without requiring operator intervention. Thus, as the CIP system 40 can provide automated cleaning, the controller assembly 50 can record operations and thereby provide a record of food processor cleaning.

The wireless communication via the communication module 70 and associated apps of the user interface provide an external control of the system 40. Thus, an operator can remotely control the cleaning process. In certain constructions, the user interface 80 is sufficiently water resistant to preclude the introduction of liquid into the system 40 through the user interface. Thus, an operator can program or use the system 40 with damp or wet hands without precluding the intended operation of the system.

The user interface 80 can be any of a variety of configurations, including touch screen, button or switch operated or application driven, wherein the application is remotely accessed by an operator. Thus, the user interface 80 can include smart phones, tablets and other portable wirelessly communicating devices and associated apps. The user interface 80 encompasses an interface capable of receiving physical user inputs such as a TUI (tactile user interface), shown in FIG. 6.

The power supply 54 can be any of a variety of constructions. In one embodiment, the power supply 54 is a battery, which can be either disposable or rechargeable (such as by a power docking station), depending on the intended operating environment of the system. Alternatively, the power supply 54 can be drawn from available electrical supply, wherein commercially available converters or transformers are intermediate the available power supply and the control circuitry 60. In a further configuration, the power supply 54 can be provided by a wireless interaction such as inductive power transfer, either to directly power or to charge a battery that then powers the system. Alternatively, the power supply 54 can be provided by solar energy, hydrogen conversion or scrubbing of available waste energy. Thus, the power supply 54 can be dry cell batteries, AC/DC inlet from wall outlet, rechargeable power supplies, either removable or embedded in the housing as well as rechargeable by a cable or wireless charging technology.

Manifold Assembly

Figure 8:
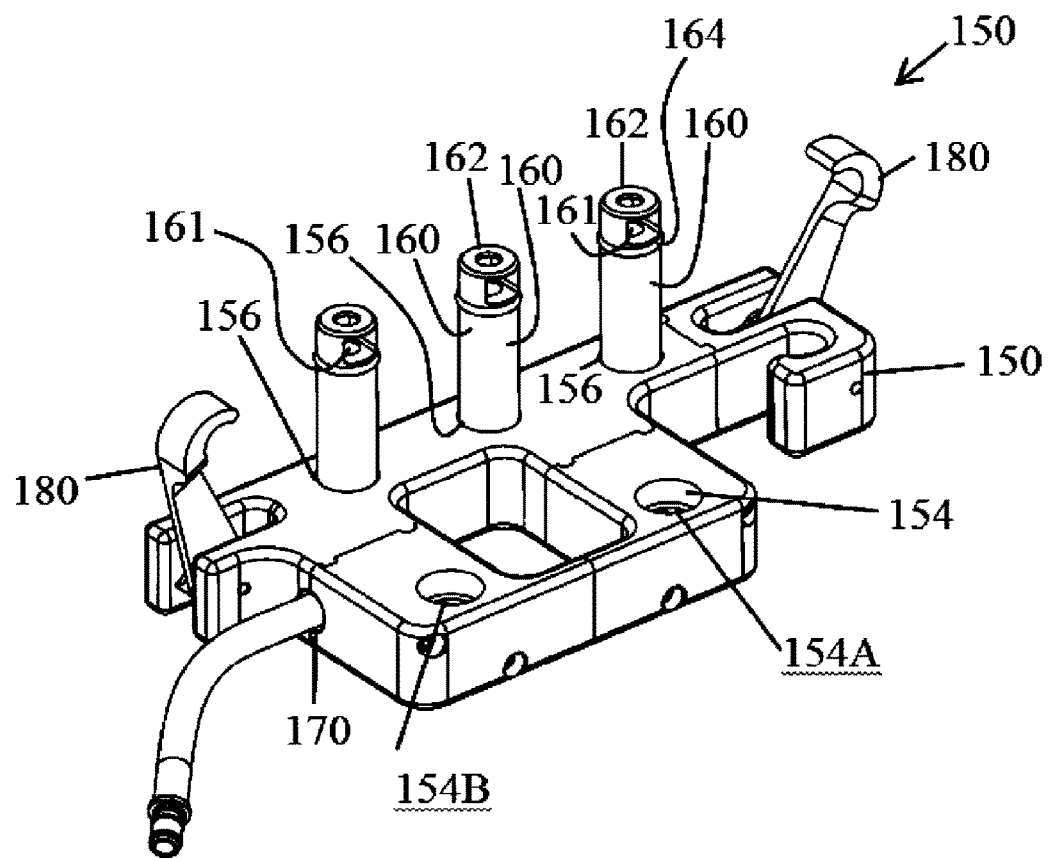
FIG. 8 is a perspective view of the distribution manifold.

As set forth above and shown in FIG. 7, the manifold assembly 100 includes the intake manifold 110 and the distribution manifold 150. Referring to FIG. 8, the distribution manifold 150 is shown having a number of inputs 154 corresponding to the number of outlets 114 of the intake manifold 110. In one configuration, as seen in FIG. 8, the distribution manifold 150 includes a first and a second input 154a, 154b and a plurality of output openings 156. The specific number of inputs 154 and outputs 156 is dictated by the intended operating environment of the system 40, and is not limited to the illustrated configuration.

The first and second inputs 154a, 154b correspond to and operably align with the outlet ports 114a, 114b of the intake manifold 110 for receiving flow from the corresponding first and second outlet ports of the intake manifold.

The output openings 156 are in fluid communication with the first and the second inputs 154a, 154b. In one configuration, the number of output openings 156 corresponds to the number of dispensing interfaces 26, dispensing valves or processing paths of the food processor 10.

Referring to FIG. 8, the manifold assembly 100 and specifically the distribution manifold 150 also includes an induction port 170 for introducing an agent into the solution. The induction port 170 is fluidly intermediate the input 112 and the output 156 of the manifold assembly 100 and particularly the input 154 and output 156 of the distribution manifold 150.

In one configuration, pressurized water is the motive fluid and the induction port 170 introduces an additional component or agent to the solution.

The agent is passed through the induction port 170 by any of a variety of mechanisms, such as pumping, metering or venturi. In the venturi configuration, the manifold assembly 100, such as the distribution manifold 150, includes a venturi (not shown), wherein the solution or motive fluid passes through the venturi to create a reduced pressure, wherein the reduced pressure is used to introduce the agent through the induction port 170. Alternatively, a pump or metering device can be used independently or in conjunction with the venturi of the manifold assembly 100 to introduce the agent into the solution.

As seen in FIGS. 9-13, each input 154 is fluidly connected to each output 156 of the distribution manifold 150 (and hence manifold assembly 100) and one induction port 170, such as the venturi, is fluidly intermediate each input and output.

As each flow path between the input 154 and the downstream output 156 in the distribution manifold 150 (or manifold assembly 100) can include one venturi (not limited to one), material or a gas may be drawn into the passing flow. Thus, a plurality of induction ports 170 (such as a venturi) can be located along the flow path in the manifold assembly 100 between a given input and output. The plurality of induction ports 170 provides for the introduction of a plurality of agents to the motive fluid. Specifically, in one configuration, a low pressure port of the venturi is fluidly connected to a supply or source of an agent, wherein the agent can be liquid, solid or gas, such as ambient pressure air. As ambient air is drawn into the venturi and the flow, bubble agitation is formed. The downstream induction port 170 (such as the low pressure port of the second venturi between the input and the output) is fluidly connected to a supply or source of the agents, such as cleaning, disinfecting or sterilizing agents, so that the introduced agent is mixed into the aerated flow.

In further configurations, it is contemplated the distribution manifold 150 (or manifold assembly 100) can include a single induction port 170 fluidly intermediate the input and the output. Alternatively, each flow path in the distribution manifold 150 (or manifold assembly 100) between the input and the output can include a corresponding induction port. Thus, different food flow paths can be exposed to different solutions, or processing parameters.

Referring to FIGS. 9-13, the distribution manifold 150 can include a variety of configurations of input(s) 154, induction port(s) 170, outputs 156 and interconnecting flow paths. These configurations can be selected to provide predetermined flows from each of the outputs 156 under anticipated operating conditions. Thus, depending on the desired performance, each output 156 can provide the same flow rate. That is, the construction of the distribution manifold 150 can be tuned to provide the desired flows from the outputs 156.

Figure 9:
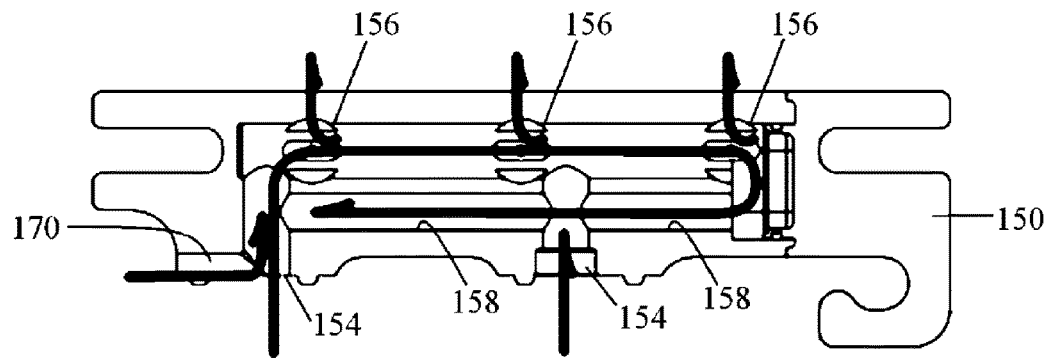
FIG. 9 is a top plan view of the flow path in a first configuration of the distribution manifold.

In a first configuration of FIG. 9, the distribution manifold 150 includes at least one but may have a plurality of inputs 154. One or more of the inputs 154 can include at least one induction port 170 to allow the addition of other gas or liquids to the solution. The induction port 170 can cooperate with a venturi or an active mechanism such as a pump or meter. Alternatively, agents (gas or liquid) can be passed through the induction port 170 by gravity feed, such as by locating a source of the agent above the induction port. Further, an operator can temporarily halt flow, and manually introduce the agent to the system through an access port.

Further, the flow path in the distribution manifold 150 can include a return portion 158 after (downstream of) the most downstream output 156, wherein the return portion is fluidly connected to the input 154 upstream of the most upstream output. The incorporation of the return portion 158 as seen in FIG. 9, allows each of the outputs 156 to have an equal cross sectional area, or diameter for circular outputs, wherein the flow from each output is equal. This eliminates the need to tune the outlet ports 156 with different diameters, which would otherwise be required in order to get the same amount of flow from each output.

Figure 10:
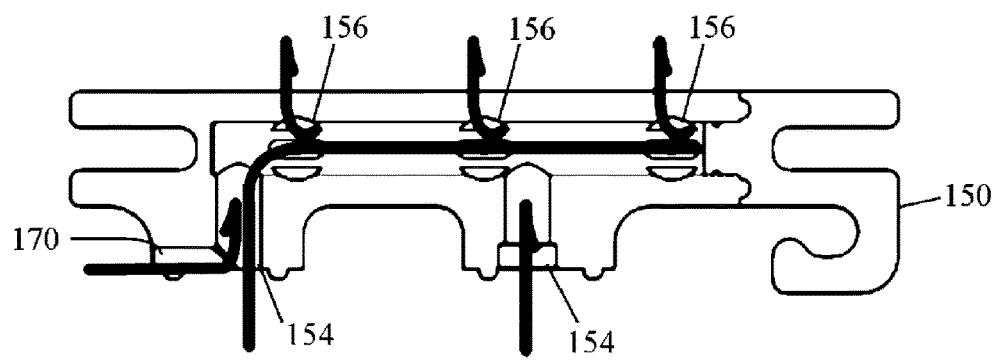
FIG. 10 is a top plan view of the flow path in a second configuration of the distribution manifold.

In a further configuration of FIG. 10, the flow path in the distribution manifold 150 does not include the return portion 158. To provide for equal flow rate from each output 156, the cross sectional area of each output is formed to accommodate the associated pressure at the particular location in the flow path. Specifically, the outputs 156 exposed to higher flow pressures in the distribution manifold 150 have a smaller cross sectional area than outputs exposed to lower pressures. Again, the distribution manifold 150 can include one or a plurality of inputs 154. One or several inputs 154 can include at least one induction port to allow the addition of other liquids and/or gas. Without the return portion in the flow path in the distribution manifold 150, the cross sectional areas of the outputs 156, such as output diameters, is specifically tuned per application in order to make the flow equal between outputs.

Figure 11:
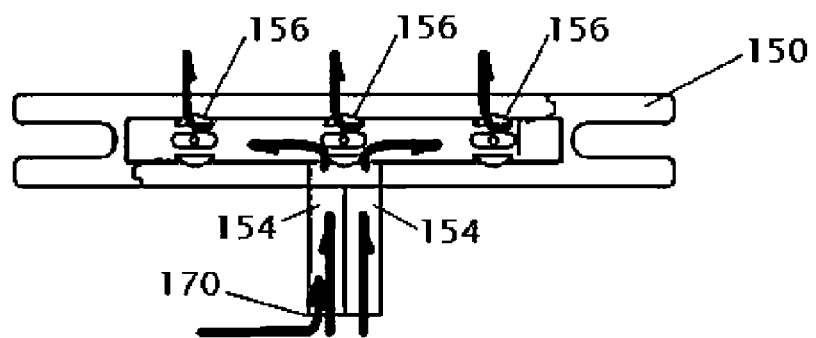
FIG. 11 is a top plan view of the flow path in a third configuration of the distribution manifold.

In a further configuration of FIG. 11, the distribution manifold 150 again includes at least one, but may have several inputs 154, wherein at least one of the inputs includes an induction port 170 to allow the addition of other liquids and/or gas. In this configuration with inputs 154 symmetrically centered between the outputs 156, the cross sectional area of the outputs (output diameters) is specifically sized, tuned, per application in order to make the liquid flow equal between outlet ports.

It is also contemplated an access port or hatch, detachable or refillable reservoir or dispenser, can be provided along with, or in place of the induction port 170 for the operator to introduce agents or additives into the flow path.

Figure 12:
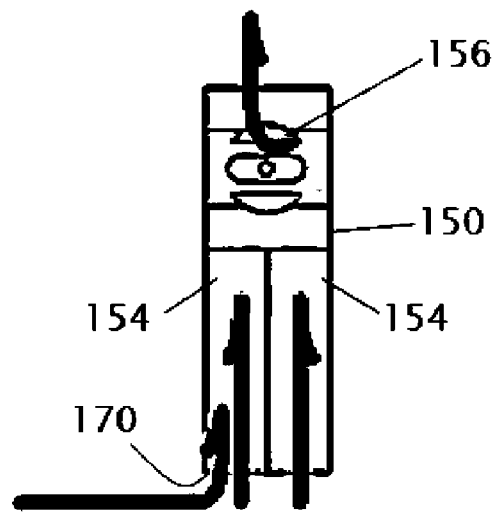
FIG. 12 is a top plan view of the flow path in a fourth configuration of the distribution manifold.

In another configuration of FIG. 12, the distribution manifold 150 includes at least one, but may have a plurality of inputs 154. At least one of the inputs 154 can include the induction port 170 to allow the addition of other liquids and/or gas to the solution. In this configuration with input symmetrically centered with the output 156, no tuning of the output is required.

Figure 13:
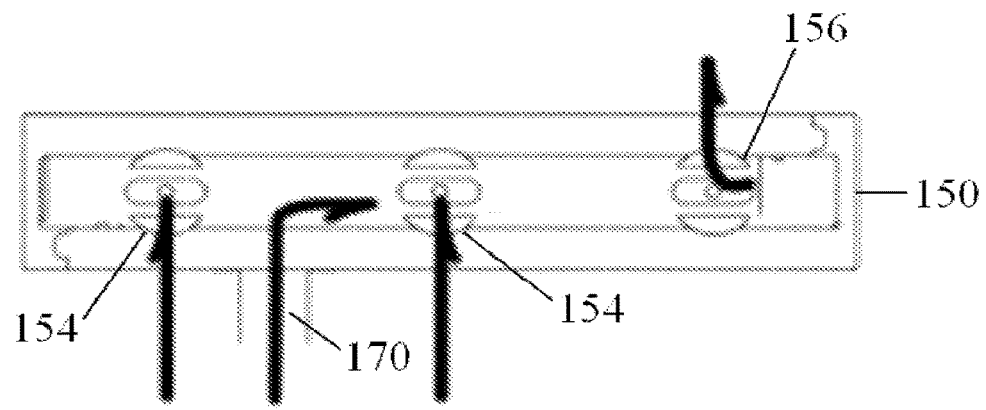
FIG. 13 is a top plan view of the flow path in a fifth configuration of the distribution manifold.

Alternatively, as seen in FIG. 13, the distribution manifold 150 includes at least one, but may have several inputs 154, wherein at least one of the inputs includes an induction port 170 to allow the addition of other liquids and/or gas. In this configuration having only a single output 156, no tuning of the outlet port is required.

However, it is understood the tuning of the distribution manifold 150 may not always be required for the system 40 to be operational, and such tuning can be selected to provide enhanced control over the exposure of the food processor 10 to the solution. Particularly, if regulation of the flow from each output 156 is not critical, the tuning of the distribution manifold 150 can be decreased.

In a further configuration, the manifold assembly 100 (including at least one of the intake manifold 110 and the distribution manifold 150) or an input 112 to the manifold assembly can include an ultrasonic generator 180 to impart pressure waves in the solution sufficient to create cavitation in the solution. The ultrasonic generator 180 can be internal or external to the food processor 10 or the system 40, thus introducing cavitation in the solution at any location along the food flow path 20. As known in the art, the ultrasonic generator 180 can be piezoelectric or magnetostrictive transducers as well as sonifier or sonicators, wherein the sonication can be direct or indirect. Thus, the solution can be in contact with a probe or can be isolated or separated from the probe. Commercially available sonifier or sonicators can be employed in the system.

In one configuration, each output of the distribution manifold 150 includes a wash barrel 160, as shown in FIG. 7, sized to be at least partially received within the dispensing interface 26 of the food processor 10. The wash barrel 160 is configured to physically contact a corresponding dispensing valve 28 of the food processor 10, such that upon operable engagement of the manifold assembly 100 with the food processor, each wash barrel contacts a corresponding dispensing valve of the food processor and disposes the corresponding dispensing valve in an open (or flow passing) position.

The wash barrel 160 includes or defines a flow path extending along a longitudinal dimension of the wash barrel. Depending upon the specific design of the dispensing valve 28 in the food processor 10, the wash barrel 160 includes a transverse exit port 161 for passing liquid from the flow path. The wash barrel 160 also includes an engaging surface 162 for engaging the dispensing valve 28 and moving the dispensing valve to the open position in response to operable engagement of the wash barrel and the dispensing interface 26 of the food processor 10. The wash barrel 160 also forms a sealed connection with the dispensing interface 26 to provide for fluid transfer to the food flow path 20.

In an alternative configuration, dispensing pistons which reside within the dispensing interface 26 can be first removed before installing the manifold assembly 100 (and the wash barrel(s) 160). Thus, in this configuration while the wash barrels 160 do not include the engaging surface 162 for engaging the dispensing valves 28, the wash barrel(s) include a sealing surface 164 for contacting the food processor 10 to create a seal for ensuring passage of the solution into the food flow path 20.

Figure 14:
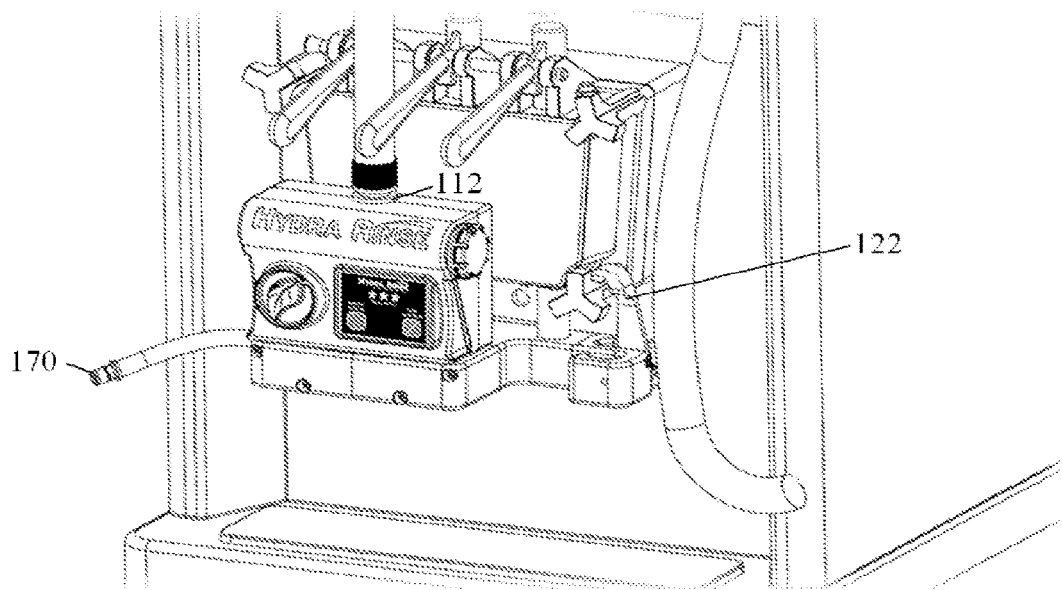
FIG. 14 is a perspective view of the stand-alone configuration operably engaged with a food processor.

The manifold assembly 100 includes an interconnect mechanism 120 for operably engaging and retaining the manifold assembly, and any affixed components relative to the food processor 10, and specifically the dispensing interface 26. As shown in FIG. 14, a pair of mounting arms 122 are rotatably mounted to the manifold assembly 100, wherein the mounting arms can be moved between a release position and an engaged position. In the engaged position, the mounting arms 122 operably retain the manifold assembly 100 and the attached controller assembly 50 relative to the food processor 10. It is understood that in alternative configurations, such as the system having a single wash barrel 160, the system 40 could rotate or snap into operable engagement with the food processor 10 without requiring independent mounting arms 122 or movement of such mounting arms.

For those configurations employing a gas or vapor as the solution, such as steam or disinfecting gas, the control assembly 50 and manifold assembly 100 are configured to provide sufficient pressurization of the food flow path 20.

Figure 16:
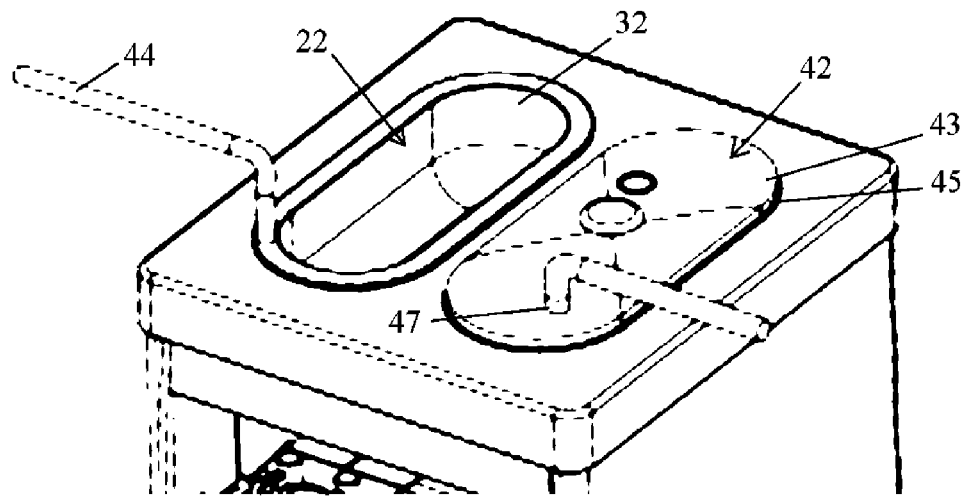
FIG. 16 is a perspective view of alternative drain lines and the hopper lid for the system.

In configurations of the food processor 10 in which the hoppers 32 define the upstream end 22 of the food flow path 20, one configuration as shown in FIG. 16, the system 40 includes a pressure cover 42 for substantially sealing the upstream end of hopper-by-pass tube(s) 44 and tubing, which extend from the hopper(s) product inlet orifice(s). The pressure cover 42 includes a lid 43 and seated seal 45 for engaging a corresponding surface adjacent a periphery of the hopper 32 or engaging the periphery of the hopper. The pressure cover 42 also includes a drain port for passing solution that has flowed counter current through the food flow path 20. A drain line(s) is connected to the drain port to direct the passed solution to a catch basin or disposal. The pressure cover 42 and the by-pass tube(s) 44 sufficiently seal the hopper(s) and inlet orifice(s) so that pressure of the cleaning solution entering the hopper by-pass-tube(s) 44 is sufficient to force material into and through the drain port. As seen in the left hopper of FIG. 16, an insert hopper, with associated drain line, can be temporarily located within the system hopper. The insert hopper/or hopper sealed cover 42 can be located within/or top mounted to the food processor hopper, wherein the insert/or cover hopper is sized to be spaced/or seal fitted from the food processor hopper so that solution can pass between/or within the hopper(s) and into the insert/or within the hopper itself.)

Figure 15:
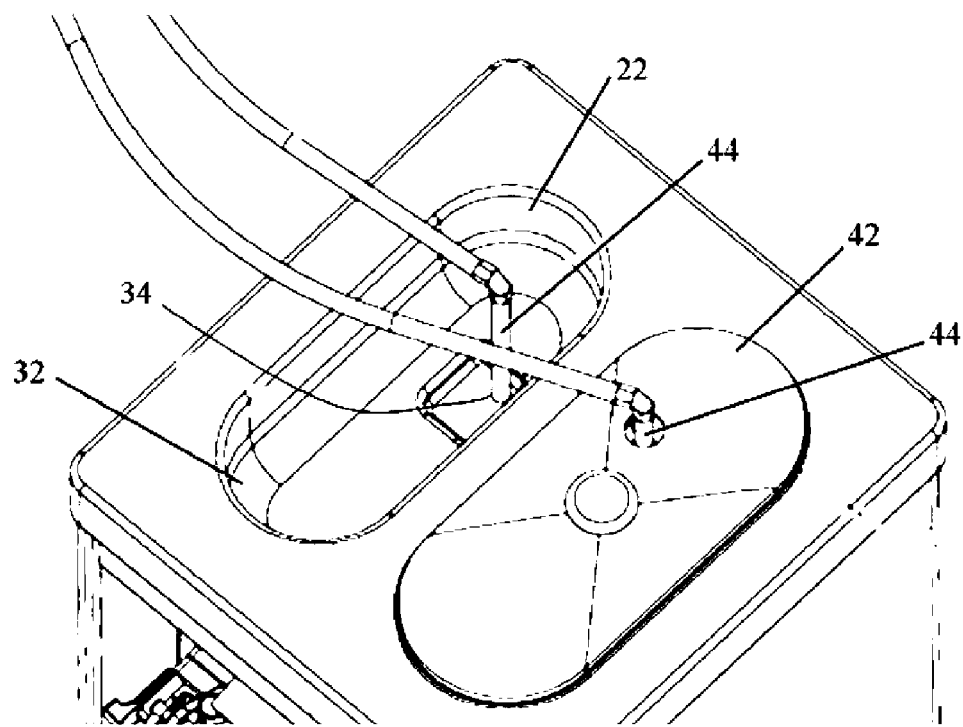
FIG. 15 is a perspective view of hopper lid for the system.

Referring to FIG. 15, the by-pass tube(s) 44 sufficiently seal hopper(s) outlet orifice(s) 34 so that pressure of the cleaning solution entering the hopper by-pass-tube(s) is sufficient to force material into and through the drain port. The bypass tube 44 connects to the food processor 10 by inserting into the product mix ports 34 in the bottom of the hopper 32. The bypass tubes 44 can be held in place by either active (mechanical) or non-active (interference fit) engagement. The connected bypass tubing 44 dispenses the machine waste into a catch basin or floor drain.

In a further alternative configuration, an insert hopper/or hopper sealed cover 42 can be located within/or top mounted to the food processor hopper, wherein the insert/or cover hopper is sized to be spaced/or seal fitted from the food processor hopper so that solution can pass between/or within the hopper(s) and into the insert/or within the hopper itself.)

Bypass Assembly

The bypass assembly of the present system fluidly connects to the food flow path 20 in the food processor 10 intermediate the upstream end 22 and the downstream end 24 of the food flow path. The bypass assembly includes the bypass line 44 fluidly connected to the food flow path 20 intermediate the upstream end 22 and the downstream end 24 of the flow path. That is, as seen in FIG. 15, the bypass line 44 connects to the food flow path 20 at a location downstream (in the normal or forward direction of product along food flow path in the food processor) and terminates at a point outside of the food flow path. Referring to FIG. 15, in one configuration, the bypass line 44 fluidly connects to the food flow path 20 at the exit of the hopper 32 and terminates in a drain or catch basin. Thus, solution introduced into the food flow path 20 at the dispensing interface 26 and flowing in the reverse direction along the food flow path passes into the bypass line 44 without contacting the material in the hopper 32 and the solution is guided from the food processor 10 through the bypass line without contacting any material in the hopper.

Figure 17:
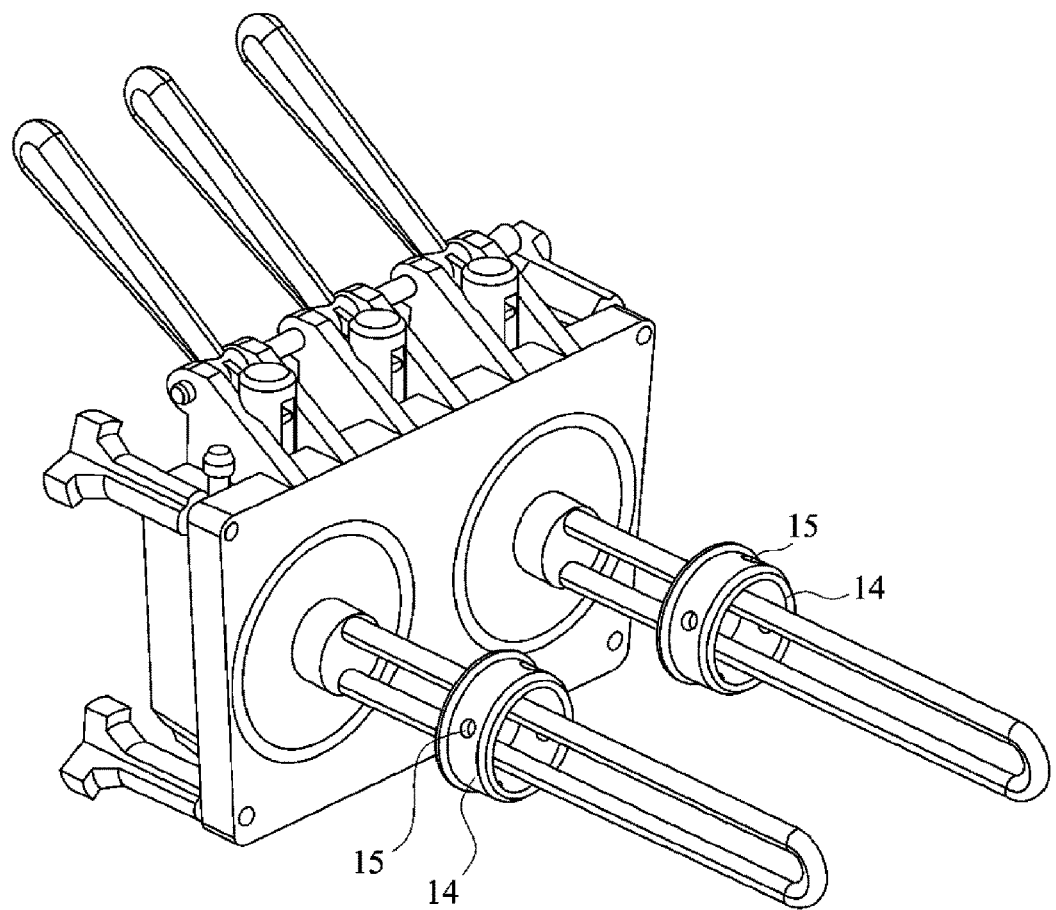
FIG. 17 is a perspective view of a rear portion of a dispensing interface and bushings of scraper blade.

In select configurations shown in FIG. 17, the food processor 10 includes a bushing or bearing 14 for retaining or locating a beater assembly 36 as seen in FIG. 1. The bushing 14 provides a wearable interface between a rotatable beater bar 38 and the mandrel or chiller tubes. The present system employs a modified bushing 14 having a flow port 15 allowing water or solution to flow to both sides (upstream and downstream side) of the bushing. Thus, solution from the manifold assembly 100 can migrate between the bushing 14 and the surrounding portion of the food processor 10 thereby allowing more complete exposure of the food path to the introduced solution. That is, the bushing 14 has an internal surface and an external surface, wherein the flow port 15 connects the internal surface to the external surface.

Figure 18:
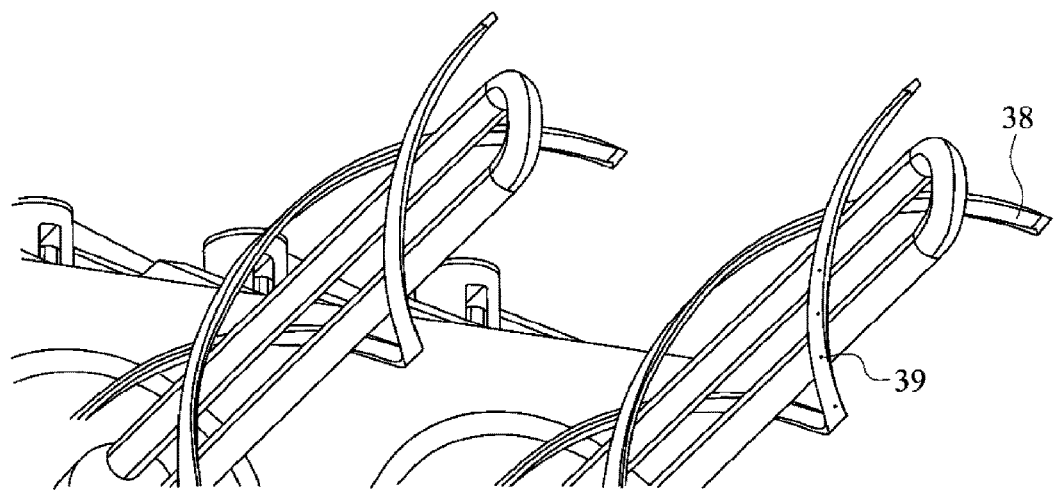
FIG. 18 is a perspective view of a bushing for a scraper blade of the food processor.
Figure 19:
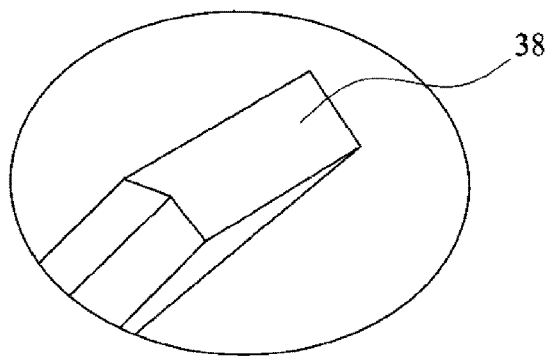
FIG. 19 is a perspective view of a modified scraper blade for the food processor.

In a further configuration shown in FIGS. 18 and 19, the present system modifies the beater blade 38 of the food processor 10. Specifically, the present beater blade 38 includes a plurality of flow holes 39 through the beater blade, wherein the flow holes permit the introduced solution, flowing in the reverse direction along the food flow path 20, to migrate between the beater bar in the beater blade, thereby providing further cleaning. It has been found advantageous to employ the apertures 39 in the beater blade 38 for food product having a relatively high fat content, such at least 8% as well as 10 to 12% or more fat content. For food product having particulate matter, such as seeds or solid food particles (cookies in dairy dessert), the beater blade 38 is employed without flow holes. In a further configuration, the beater blade 38 is modified to include only one surface contacting member to a beater barrel of the food processor 10. That is, only a single beater blade edge contacts the beater barrel. As seen in the FIG. 18, the beater bar supports two beater blades 38, however the modification removes one of the blades so only one edge of one beater blade contacts the barrel.

In a further alternative structure, a sealant is located between the beater bar and the beater blade 38 to form a self-conforming configuration of the beater blade and forms a one-to-one seal between the beater bar and the beater blade, thereby reducing migration of product between the beater bar and the beater blade. A commercially available food grade sealant can be used between the beater blade 38 and the beater bar. This reduces the amount of fluid used to clean the machine and reduces the cycle time of the system 40. It is understood any combination of these beater blade, beater bar configurations can be employed.

Referring to FIG. 1, the present system also optionally self-lubricating O-rings and seals 16 in place of traditional food grade grease for sealing. The use of self-lubricating O-rings and seals 16 allows for the elimination of a food safe lubrication to place the food processor in an operable status. As the reintroduction of the food grade lubricant is not necessary after cleaning, the present system 40 provides for reduced maintenance time. Satisfactory self-lubricating O-rings and seals 16 include commercially available plastic or elastomer O-rings and seals impregnated with approximately 3%-5% polytetrafluoroethylene (PTFE) or bearing, but not limited to a PTFE coating as commercially available. The present O-rings and food contacting sealing surfaces 16 include a PTFE (Teflon®) coating a registered mark of E. I. Du Pont De Nemours and Company Corporation) coating or impregnation, thereby removing the need for removal and reapplication of food grade grease.

Operation

In operation, the operator mechanically connects the manifold assembly 100 to the dispensing interface 26 of the food processor 10 by engaging the mounting arms 122 with the food processor, as shown in FIG. 14. The wash barrels 160 contact the corresponding dispensing valves 28 of the food processor 10 and upon operable engagement of the manifold assembly 100 to the food processor 10, the wash barrels dispose the dispensing valves to the open position. One induction port 170 of the manifold assembly 100 is connected to a supply of cleaning, disinfecting or sterilizing solution as depending upon the intended cleaning process, and the remaining induction port may be allowed to aspirate ambient air. The inlet port 112 of the intake manifold 110 is connected to the public utility water supply or a portable pressurized water supply and thus a positive pressure is placed upon the control valves 90.

The operator then programs the controller assembly 50 via the available user interface 80 for the desired cleaning (wash)-rinse cycles. For example, the operator can select from one of three options: (i) Rinse only; (ii) Wash only and (iii) Rinse-Wash cycle. Alternatively a second and final rinse cycle can be performed if the operator desires to rinse out the wash solution residual prior to reintroducing the food product mix back into the machine. That is, the controller assembly 50 can include a number of predetermined rinse, wash or combination cycles along with preset soak times.

Further, depending upon the intended cleaning with respect to the material in the hopper(s) 32 of the food processor 10, the bypass lines 44 may be fluidly connected to the ports 34 of the hoppers such that introduced solution passes through the bypass tubes 44 rather than contacting the hopper and thus does not contact any material within the hoppers, thereby permitting the operator to minimize the waste of food product, while reducing entire cleaning cycle time.

Alternatively, if the hoppers 32 are part of the entire food processor cleaning process, the bypass lines 44 are placed in the hoppers after the operator cleans the hopper using the wand assembly and/or sanitation wipes. The drain line(s) are connected to the drain port(s).

The controller assembly 50 selectively controls the control valves 90 corresponding to the input program to pass water or solution through the wash barrel(s) 160 and into the open dispensing valve(s) 28 of the food processor 10. The introduced water/solution passes countercurrent through the food flow path 20 in the food processor 10 and the apertures in the bushings 14 and beater blades 38 (if employed).

The controller assembly 50 is also operatively connected to the ultrasonic generator 180 for selectively operating the generator to introduce corresponding cavitation in the solution.

Additionally or alternatively, the controller assembly 50 can control the optional aspiration of air into the flow via the induction port 170 including a first venturi. Thus, the controller assembly 50 provides for the selective introduction of bubbles into the counter current flow, wherein the bubbles enhance the cleaning action of the rinse. It is believed the bubbles increase turbulence and kinetic energy in the passing flow, thereby enhancing the cleaning action.

The cleaning solution ultimately passes into the bypass tubes 44 and may be captured or disposed of down the available drain. Alternatively, if the bypass lines 44 are not employed, the solution passes from the drain port 47 in the pressure cover 42 for disposal.

Upon completing the programmed cycles, the present system 40 automatically terminates the flow of solutions-rinses through the food processor. The present system 40 can be then disconnected from the dispensing interface 26 of the food processor 10 and the bypass tubes 44 removed from the hopper(s) 32 (or the pressure cover 42 removed) thereby allowing for normal operation of the food processor, subsequent to the present clean in place.

Alternatively, for those configurations of the integral system, valves interconnecting the manifold assembly and the food flow path are closed, thereby isolating the system from the food flow path.

Figure 20A:
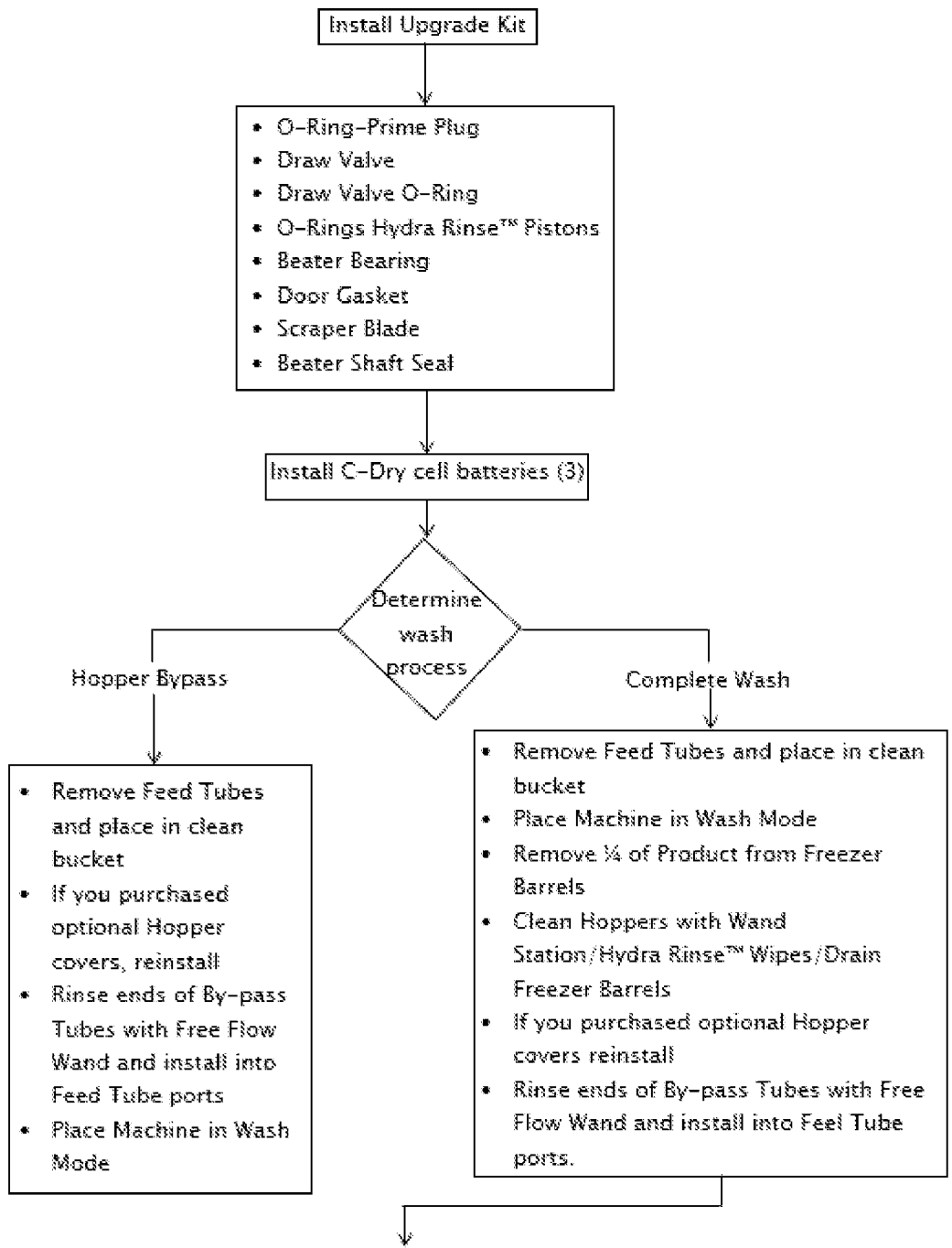
FIG. 20 is a flow chart of a representative cleaning cycle of the present system.
Figure 20B:
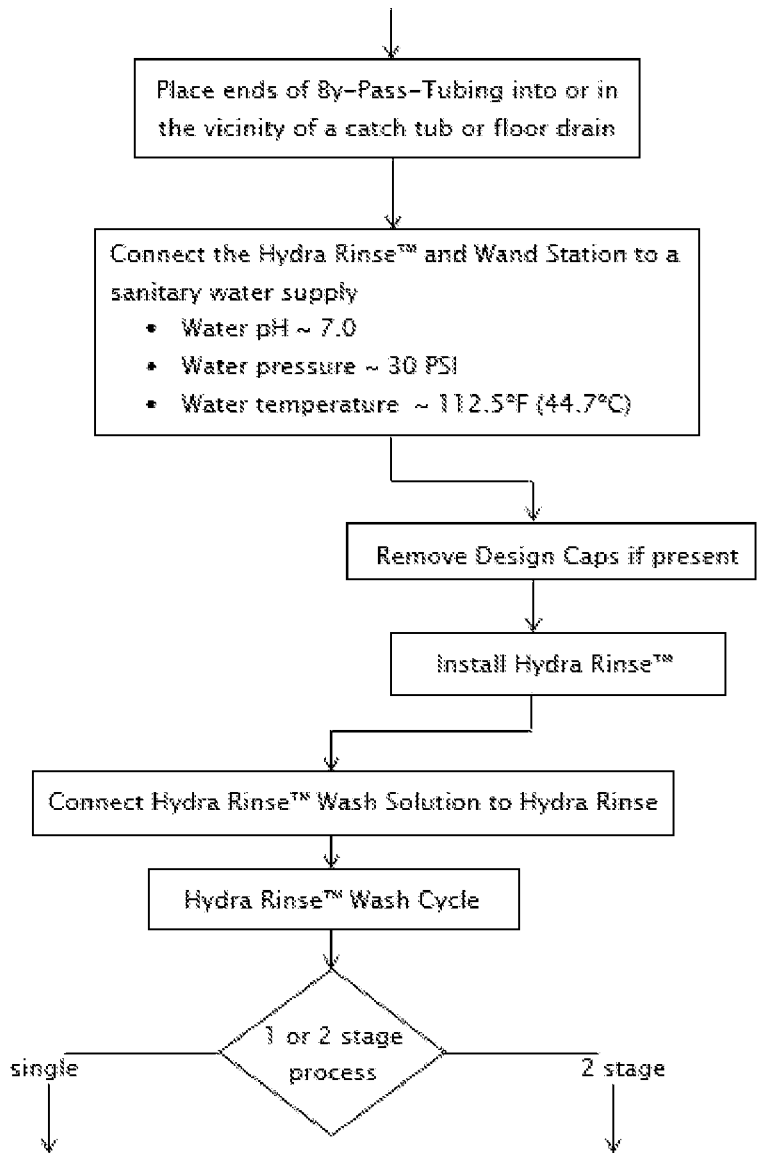
Figure 20C:
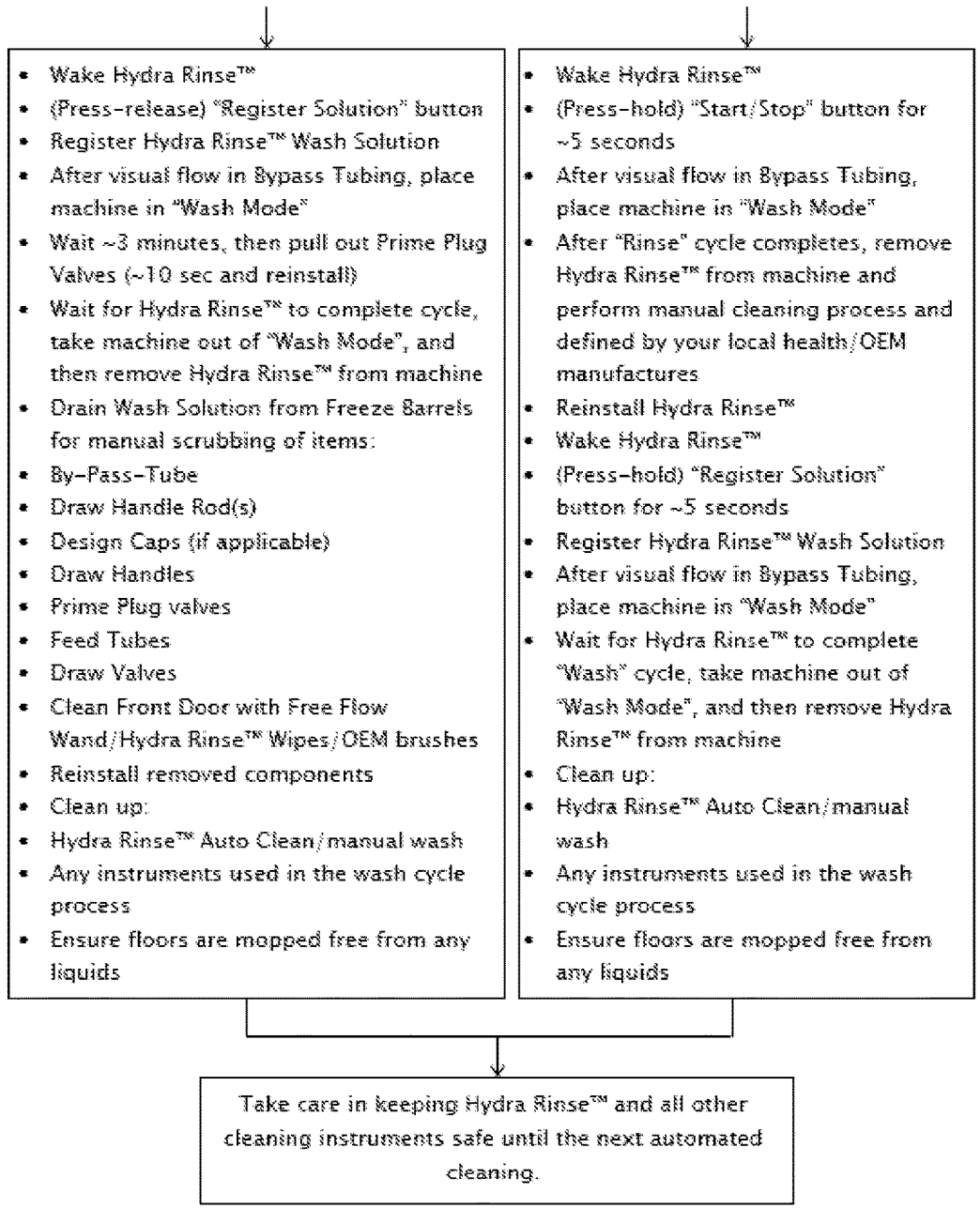

A representative flow chart is shown in FIG. 20.

Wand Assembly

Figure 21:
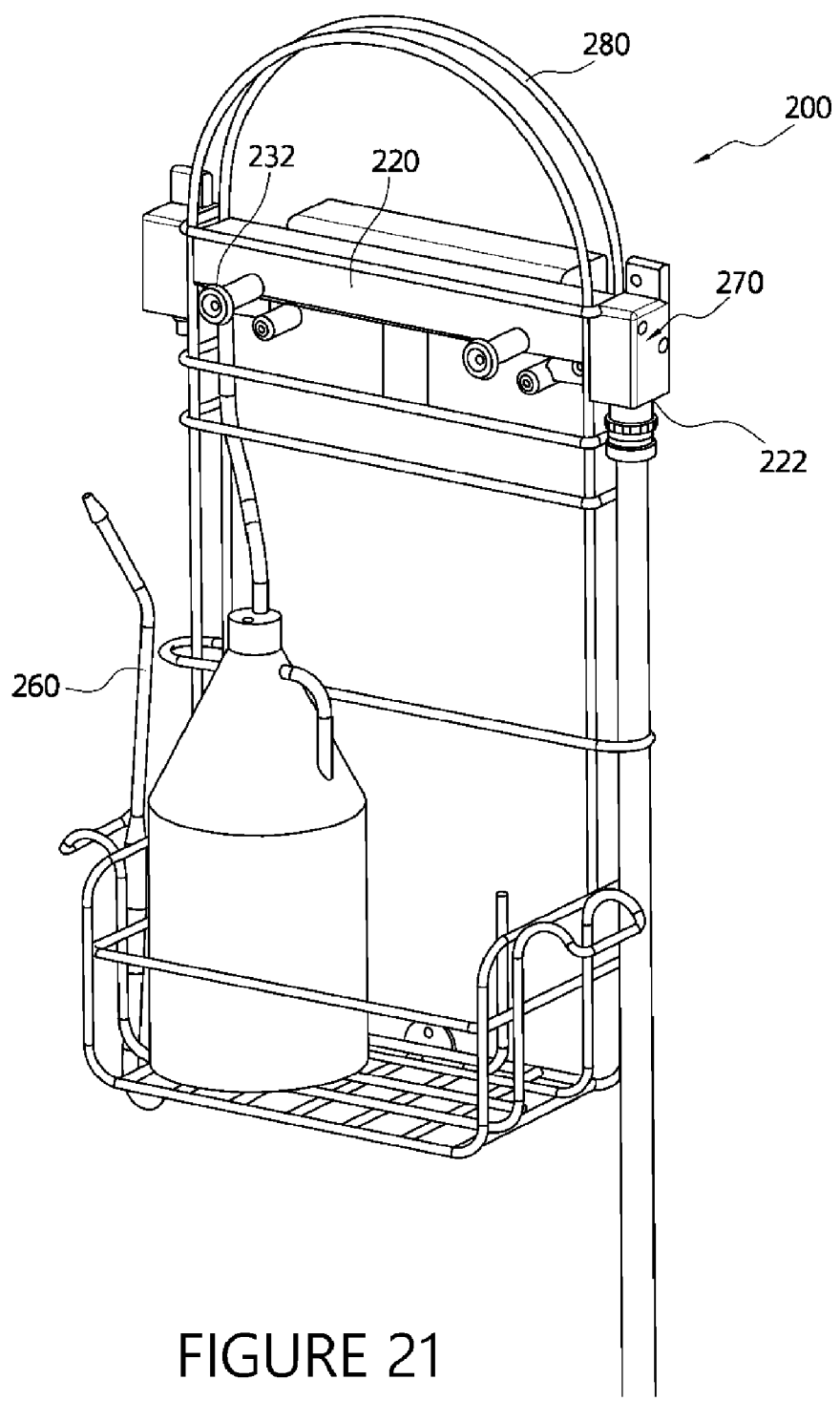
FIG. 21 is a perspective view of a first configuration of a wand assembly.

Referring to FIG. 21, the present system can further include a wand assembly 200 comprising a wand manifold 220 and a wand 260, wherein the wand can be connected to the wand manifold by an interconnecting hose(s) 250.

The wand manifold 220 includes a separate water inlet port 222 such as for receiving water from the public utility supply or other pressurized sources.

Figure 22:
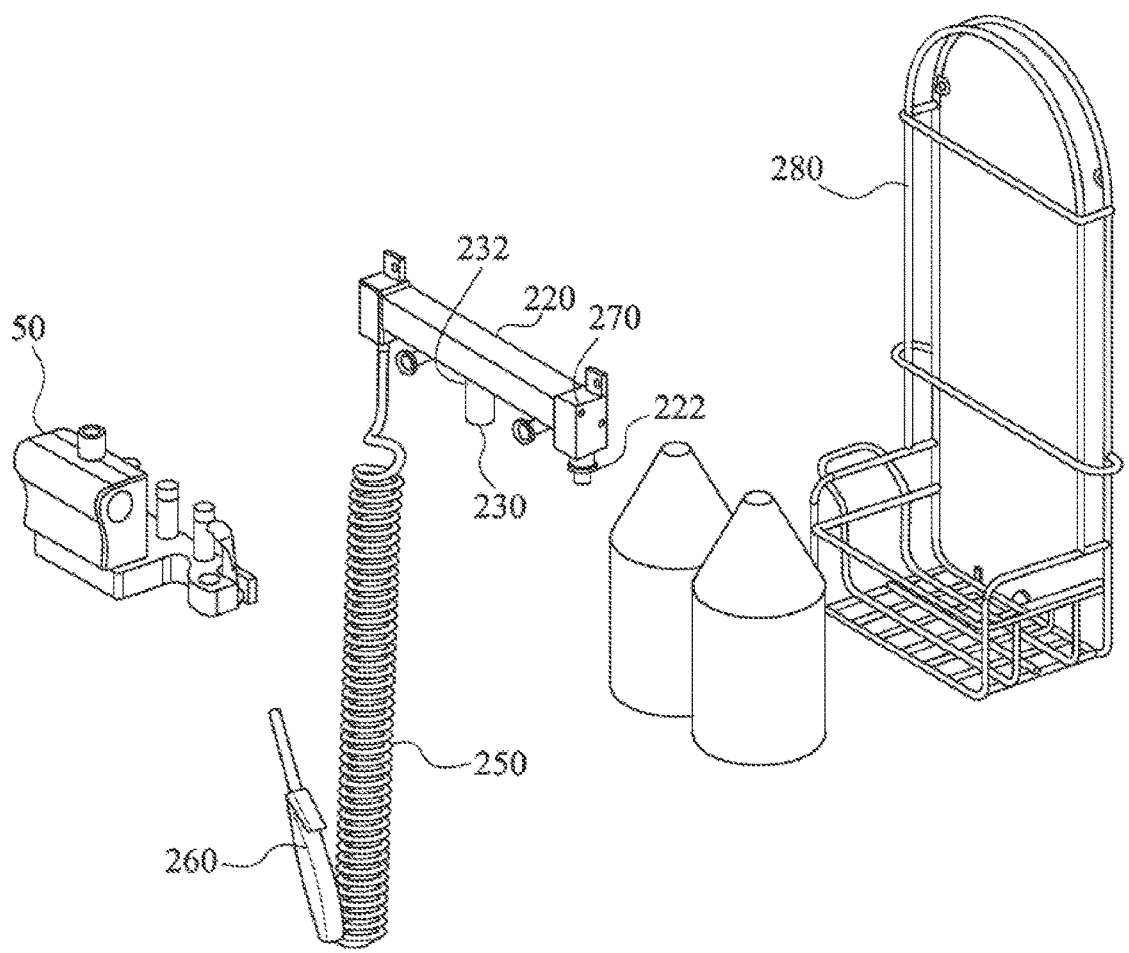
FIG. 22 is an exploded perspective view of a second configuration of a wand assembly.
Figure 24:
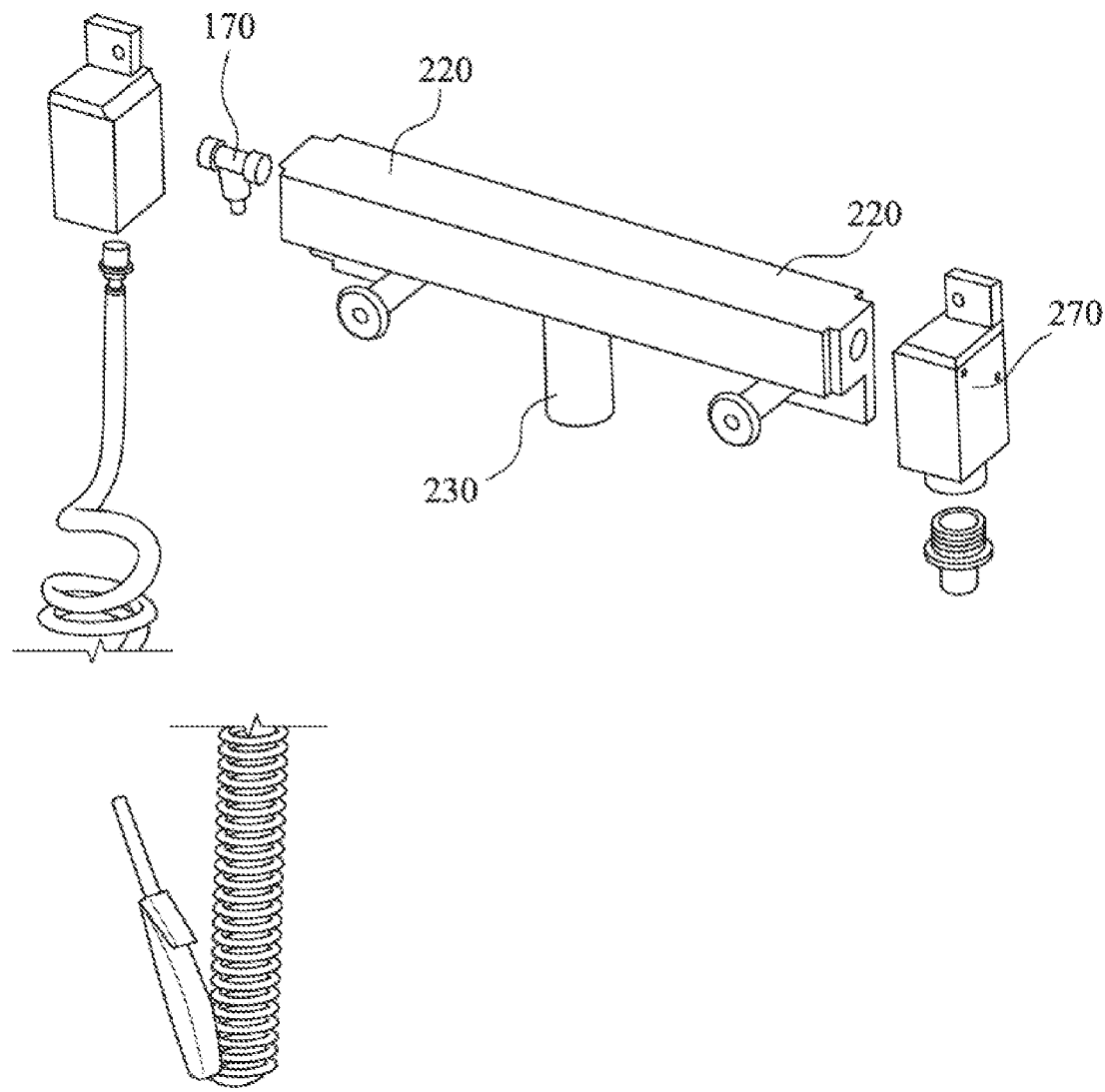
FIG. 24 is an exploded perspective view of a portion of the wand assembly of FIG. 23.

Referring to FIGS. 22 and 24, the wand manifold 220 includes an induction port 230 such as a venturi 232 for aspirating or drawing in a cleaning, disinfecting or sterilizing solution, wherein the solution is passed for selective dispensing by the wand 260.

In further configurations, the wand manifold 220 can allow for an optional supply of fresh water supply. Alternatively, the ability to select substitute cleaners is set by the configuration of the wand 260 or wand manifold 220 itself by the operator. Thus, a plurality of venturi and/or metering pumps can be connected to the wand manifold 220. In the configuration using a metering pump, a flow meter(s) can be used in conjunction with an onboard micro-processor, which could be powered in many different ways i.e. replaceable batteries, re-chargeable batteries, directly connected to a continuous power supply. The wand assembly 200 can also contain a communication module 270 as set forth above, and thus have for example RFID technology that records and confirms OEM solutions are being used to keep the integrity of the system as intended.

Thus, the wand manifold 220 can be as simple as a clear tube, such as a clear tube, for the purpose of housing at least one inlet induction port into the directed flow path. In another configuration, the wand manifold 220 can be intelligent with flow sensor(s), temperature sensor(s), chemical sensor(s), valve(s), microprocessor(s) capable of controlling and sensing flow through the wand manifold and reporting information in real time and post processing by means of the communication module as set forth above, such as RFID, Bluetooth, Wi-Fi.

Figure 23:
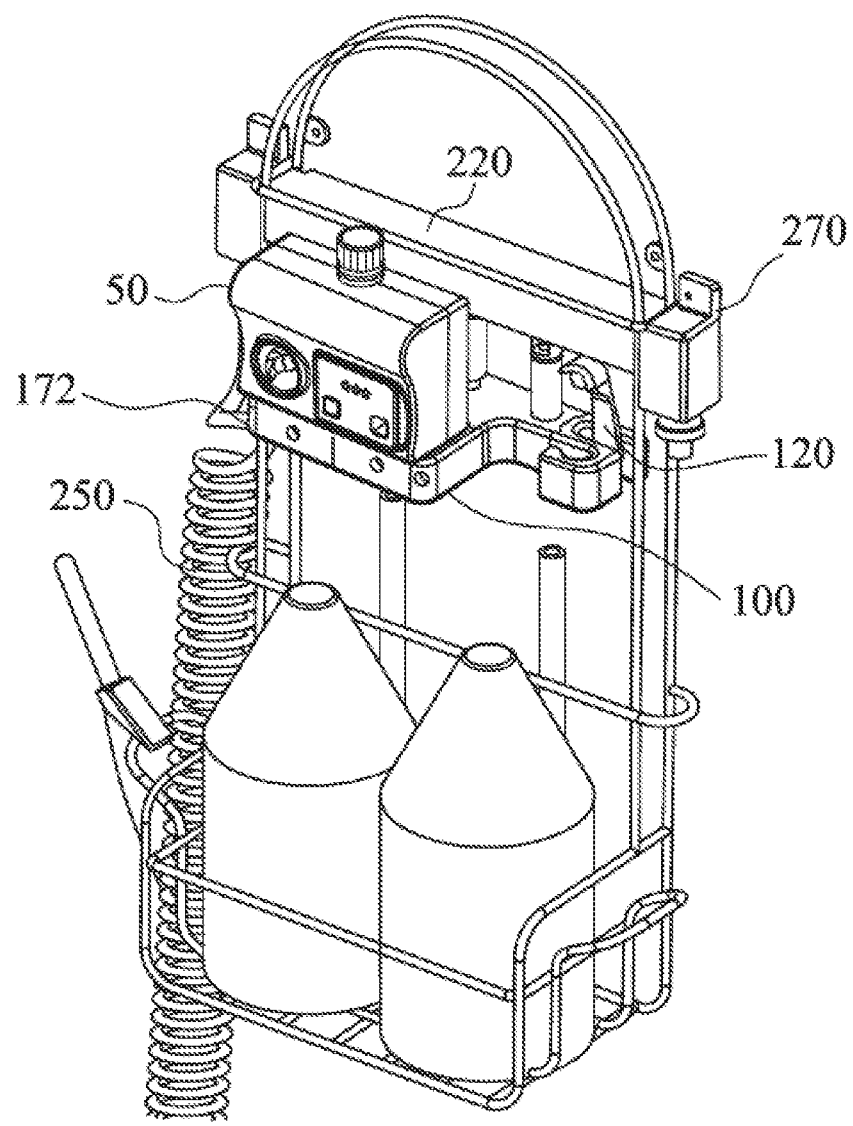
FIG. 23 is a perspective view of the wand assembly of FIG. 22.

In a further configuration as seen in FIGS. 22 and 23, the wand assembly 200 can be integrated into the CIP system 40, so that the controller assembly 50 can operate both the manifold assembly 100 and the wand assembly 200. Further, the manifold assembly 100 can be fluidly connected to the wand assembly 200 so that the composition of solution flow through the wand assembly is controlled by the control circuitry 60 of the controller assembly 50.

In operation of the wand assembly 200, actuation of the wand permits flow through the induction port 170 or venturi 172.

In a further configuration, the wand assembly 200 can be selected to accommodate two different and selectable flow rates. The wand 260 and venturi 172 are selected such that (i) a first flow rate which does not draw in the additive (agent)—thereby providing an additive free rinse and (ii) a second flow rate which draws the solution into the passing flow. The flow rates can be provided by operating positions of the wand 260, such as a position of the tip or an orientation of the tip or mechanical flow control such as valving or selective flow obstruction.

It is further contemplated the present system may be stored on a rack 280 for retaining the controller assembly 50, the wand manifold 220 as well as supplies of cleaning solution and the wand assembly.

Although the present system 40 has been set forth as providing for passage of the solution counter current (or reverse) of the forward flow through the food flow path 20 in the food processor 10, it is understood the system can be operably located at an upstream position or upstream end of the food flow path to pass the solution in a forward direction along the food flow path.

It is also contemplated that agents or additives can be introduced by the operator introducing such agents or additives through an access door or port during a flow or no-flow status of the system 40.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A food processor comprising:
   (a) a food flow path extending from a food flow path input to a food flow path output, wherein food product passes in a forward direction along the food flow path from an upstream portion of the food flow path to a downstream portion of the food flow path, the food flow path having a freezer chamber, the freezer chamber having an inlet and an outlet; and
   (b) a control valve fluidly connected to (i) the food flow path and a source of a pressurized solution, the control valve moveable between an open position passing fluid flow of the pressurized solution to the food flow path in a reverse direction through a portion of the freezer chamber and a closed position precluding fluid flow of the pressurized solution through the control valve to the food flow path.

2. The food processor of claim 1, wherein the pressurized solution is a pressurized cleaning solution.

3. The food processor of claim 1, further comprising a source of pressurized solution fluidly connected to the control valve.

4. The food processor of claim 1, further comprising control circuitry operably connected to the control valve, the control circuitry configured to selectively dispose the control valve in the open position or the closed position.

5. The food processor of claim 4, wherein the control circuitry is configured to receives external control signals.

6. The food processor of claim 4, wherein the control circuitry is configured to receive remotely generated control signals.

7. The food processor of claim 1, wherein the food flow path output includes a dispensing interface for passing food product from the food flow path.

8. The food processor of claim 1, wherein the food flow path output includes a dispensing interface for passing food product from the food flow path, the dispensing interface having a plurality of dispensing valves.

9. The food processor of claim 1, further comprising control circuitry operably connected to the control valve, the control circuitry configured to selectively dispose the control valve in the open position or the closed position, wherein the control circuitry wirelessly communicates with the control valve.

10. The food processor of claim 1, further comprising control circuitry operably connected to the control valve, the control circuitry configured to selectively dispose the control valve in the open position or the closed position, wherein the control circuitry is electrically connected to the control valve.

11. The food processor of claim 1, further comprising a controller and a wireless connection between the controller and the control valve.

12. The food processor of claim 1, further comprising a controller and an electrical connection between the controller and the control valve.

13. The food processor of claim 1, further comprising a manifold assembly having (i) a manifold assembly input adapted to receive the pressurized solution and (ii) a manifold assembly output selectively fluidly connected to the food flow path intermediate the upstream portion and the downstream portion, wherein the control valve is disposed within the manifold assembly intermediate the manifold assembly input and the manifold assembly output.

14. The food processor of claim 1, further comprising control circuitry operably connected to the control valve, the control circuitry configured to selectively dispose the control valve in the open position or the closed position, wherein the control circuitry communicates with the food processor.

15. The food processor of claim 1, further comprising control circuitry operably connected to the control valve, the control circuitry configured to selectively dispose the control valve in the open position or the closed position, wherein the control circuitry communicates directly with the food processor.

16. The food processor of claim 1, wherein the control valve is integral with the food processor.

17. The food processor of claim 1, wherein the control valve is embedded within the food processor.

18. The food processor of claim 1, wherein the control valve is internal to the food processor.

19. A food processor comprising:
(a) a first food flow path extending from a first input to a first output, wherein the first food flow path is configured to pass food product in a forward direction along the first food flow path from the first input to the first output;
(b) a first freezer chamber in the first food flow path, the first freezer chamber having an inlet and an outlet;
(c) a second food flow path extending from a second input to a second output, wherein the second food flow path is configured to pass food product in a forward direction along the second food flow path from the second input to the second output;
(d) a second freezer chamber in the second food flow path, the second freezer chamber having an inlet and an outlet;
(e) a manifold assembly including (i) an inlet port adapted to receive a pressurized solution, (ii) a first output opening configured to selectively fluidly connect to the first food flow path and (iii) a second output opening configured to selectively fluidly connect to the second food flow path; and
(f) a control valve configured to selectively pass pressurized solution from the first output opening of the manifold assembly into the first food flow path and from the second output opening of the manifold assembly into the second food flow path, the control valve moveable between (i) an open position permitting fluid flow from the manifold assembly and (ii) a closed position precluding fluid flow from the manifold assembly.

20. The food processor of claim 19, wherein the manifold assembly is separable from the first food flow path and the second food flow path.

21. The food processor of claim 19, further comprising control circuitry operably connected to the control valve, the control circuitry configured to selectively dispose the control valve in the open position or the closed position.

22. The food processor of claim 21, wherein the control circuitry is configured to receive external control signals.

23. The food processor of claim 19, wherein the manifold assembly is integral with the first food flow path and the second food flow path.

24. A food processor comprising:
(a) a food flow path for processing food, the food flow path having a forward flow direction along the food flow path for processing food, the food flow path including an enclosed length and a freezer chamber;
(b) a control valve connected to the food flow path, the control valve configured to selectively permit passage of a cleaning solution into the food flow path;
(c) a controller connected to the control valve, the controller configured to regulate passage of a cleaning solution into the food flow path; and
(d) a communication line connected to the controller to pass control signals to the control valve.

25. The food processor of claim 24, wherein the food flow path includes an inlet port and an outlet port and the control valve passes cleaning solution into the food flow path intermediate the inlet port and the outlet port.

26. The food processor of claim 24, wherein the communication line is wireless.

27. The food processor of claim 24, wherein the communication line is integral with the food processor.

* * * * *